(12) United States Patent
Wang et al.

(10) Patent No.: US 11,595,158 B2
(45) Date of Patent: Feb. 28, 2023

(54) METHODS AND APPARATUSES FOR SPS HARQ-ACK TRANSMISSION

(71) Applicant: FG Innovation Company Limited, Tuen Mun (HK)

(72) Inventors: Hai-Han Wang, Taipei (TW); Chia-Hao Yu, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 17 days.

(21) Appl. No.: 17/150,933

(22) Filed: Jan. 15, 2021

(65) Prior Publication Data

US 2021/0218504 A1 Jul. 15, 2021

Related U.S. Application Data

(60) Provisional application No. 62/961,414, filed on Jan. 15, 2020.

(51) Int. Cl.
*H04W 72/12* (2009.01)
*H04L 1/1812* (2023.01)
*H04W 72/1273* (2023.01)
*H04W 72/1268* (2023.01)

(52) U.S. Cl.
CPC ....... *H04L 1/1812* (2013.01); *H04W 72/1268* (2013.01); *H04W 72/1273* (2013.01); *H04W 72/1289* (2013.01)

(58) Field of Classification Search
CPC ... H04L 1/1812; H04L 5/0044; H04L 5/0094; H04L 1/1819; H04L 1/1854; H04L 1/1861; H04L 5/0055; H04W 72/1268; H04W 72/1273; H04W 72/1289; H04W 72/0406

See application file for complete search history.

(56) References Cited

U.S. PATENT DOCUMENTS 11,096,219 B2 * 8/2021 Huang ................. H04L 5/0053

FOREIGN PATENT DOCUMENTS

EP 3270642 A1 * 1/2018 ............. H04J 11/00
EP 2661006 B1 * 1/2019 ............ H04J 3/1694

OTHER PUBLICATIONS

OPPO: "HARQ Enhancements for NR-U", 3GPP Draft, 3GPP TSG RAN WG1 #98bis, R1-1910792, Oct. 8, 2019 (Oct. 8, 2019), XP051809198, 8 Pages (Year: 2019).*
LG Electronics: "HARQ Procedure for NR-U," 3GPP Draft, 3GPP TSG RAN WG1 #98bis, R1-1910821 NR-U HARQ Final, No. Chongqing, China; Oct. 14, 2019-Oct. 20, 2019, Oct. 8, 2019 (Oct. 8, 2019), XP051809211, 22 pages (Year: 2019).*
3GPP TS 38.133, "3rd Generation Partnership Project; Technical Specification Group Radio Access Network; NR; Requirements for support of radio resource management (Release 15)", V15.8.0 (Dec. 2019).

(Continued)

*Primary Examiner* — Lan-Huong Truong
(74) *Attorney, Agent, or Firm* — ScienBiziP, P.C.

(57) ABSTRACT

A method by a user equipment (UE) includes receiving a radio resource control (RRC) configuration carrying a configuration for a first downlink (DL) channel and an uplink (UL) channel, receiving the first DL channel and a second DL channel, and canceling the UL channel when a timing condition between the first DL channel and the second DL channel is satisfied.

10 Claims, 11 Drawing Sheets

(56) References Cited

OTHER PUBLICATIONS

3GPP TS 38.321, "3rd Generation Partnership Project; Technical Specification Group Radio Access Network; NR; Medium Access Control (MAC) protocol specification (Release 15)", V15.8.0 (Dec. 2019).
3GPP TS 38.214, "3rd Generation Partnership Project; Technical Specification Group Radio Access Network; NR; Physical layer procedures for data (Release 15)", V15.7.0 (Sep. 2019).
3GPP TS 38.211, "3rd Generation Partnership Project; Technical Specification Group Radio Access Network; NR; Physical channels and modulation (Release 15)", V15.8.0 (Dec. 2019).
3GPP TS 38.213, "3rd Generation Partnership Project; Technical Specification Group Radio Access Network; NR; Physical layer procedures for control (Release 15)", V15.7.0 (Sep. 2019).

* cited by examiner

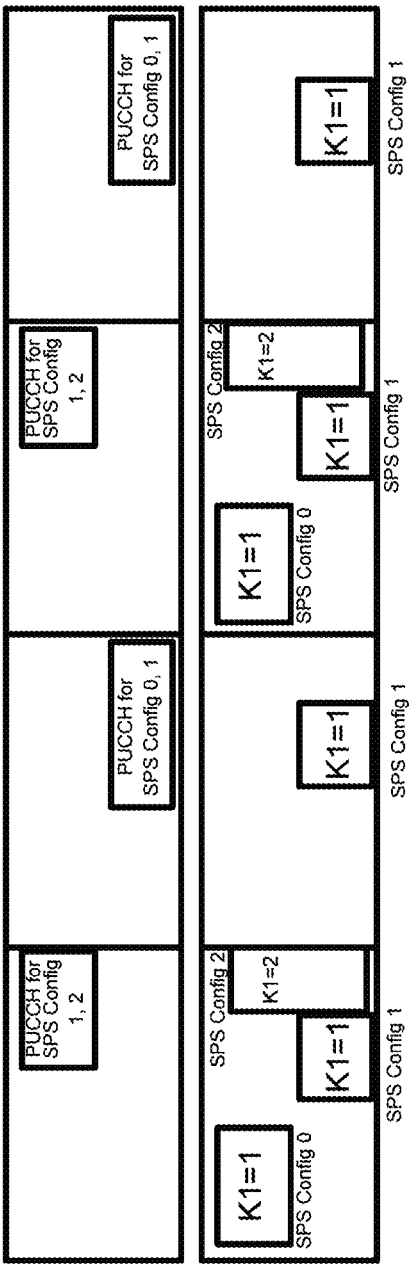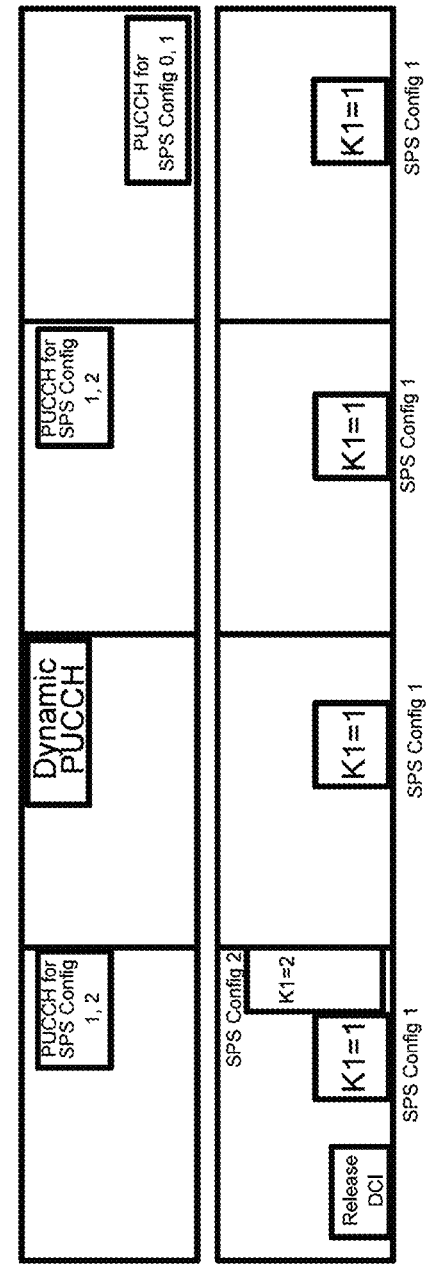
FIG. 2A
FIG. 2B

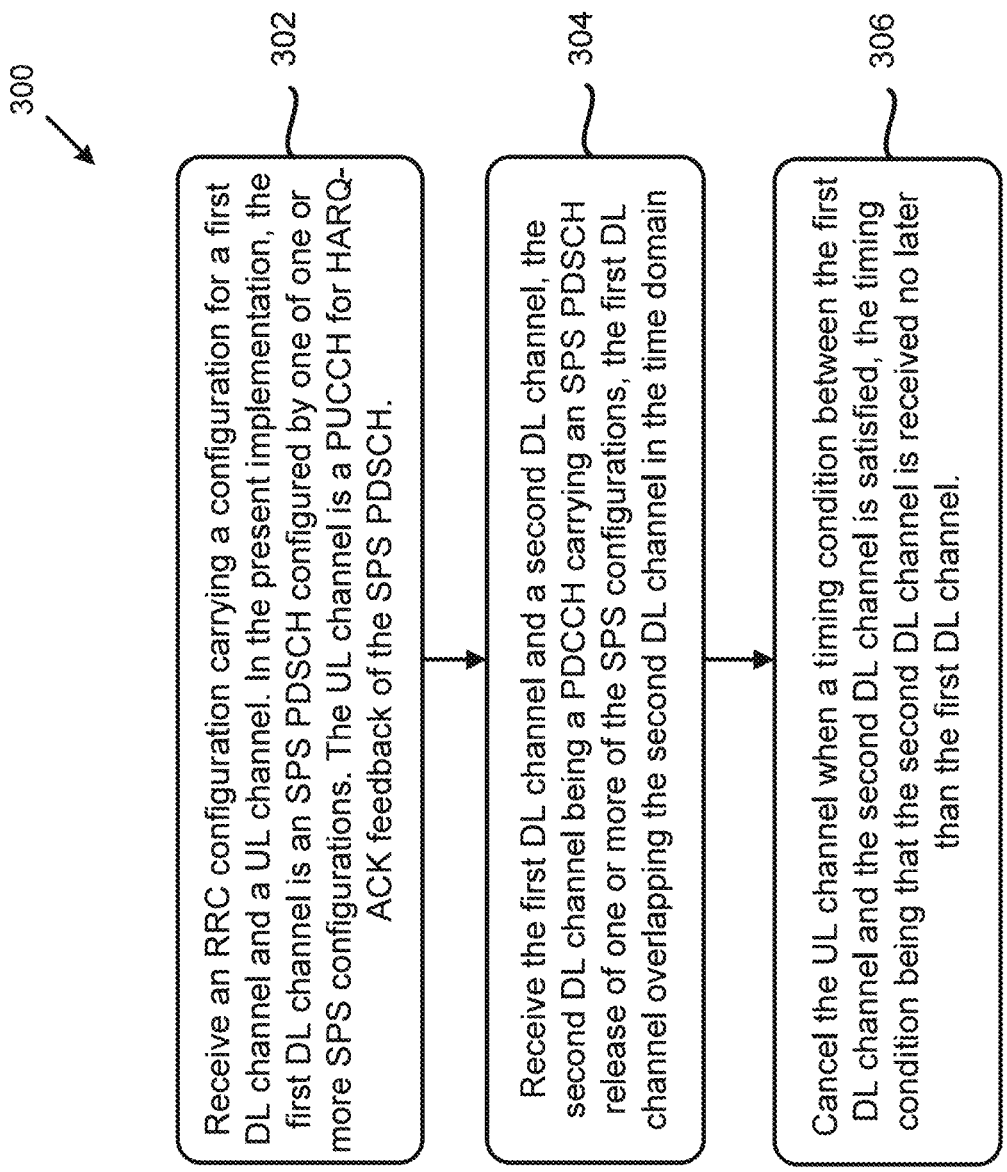

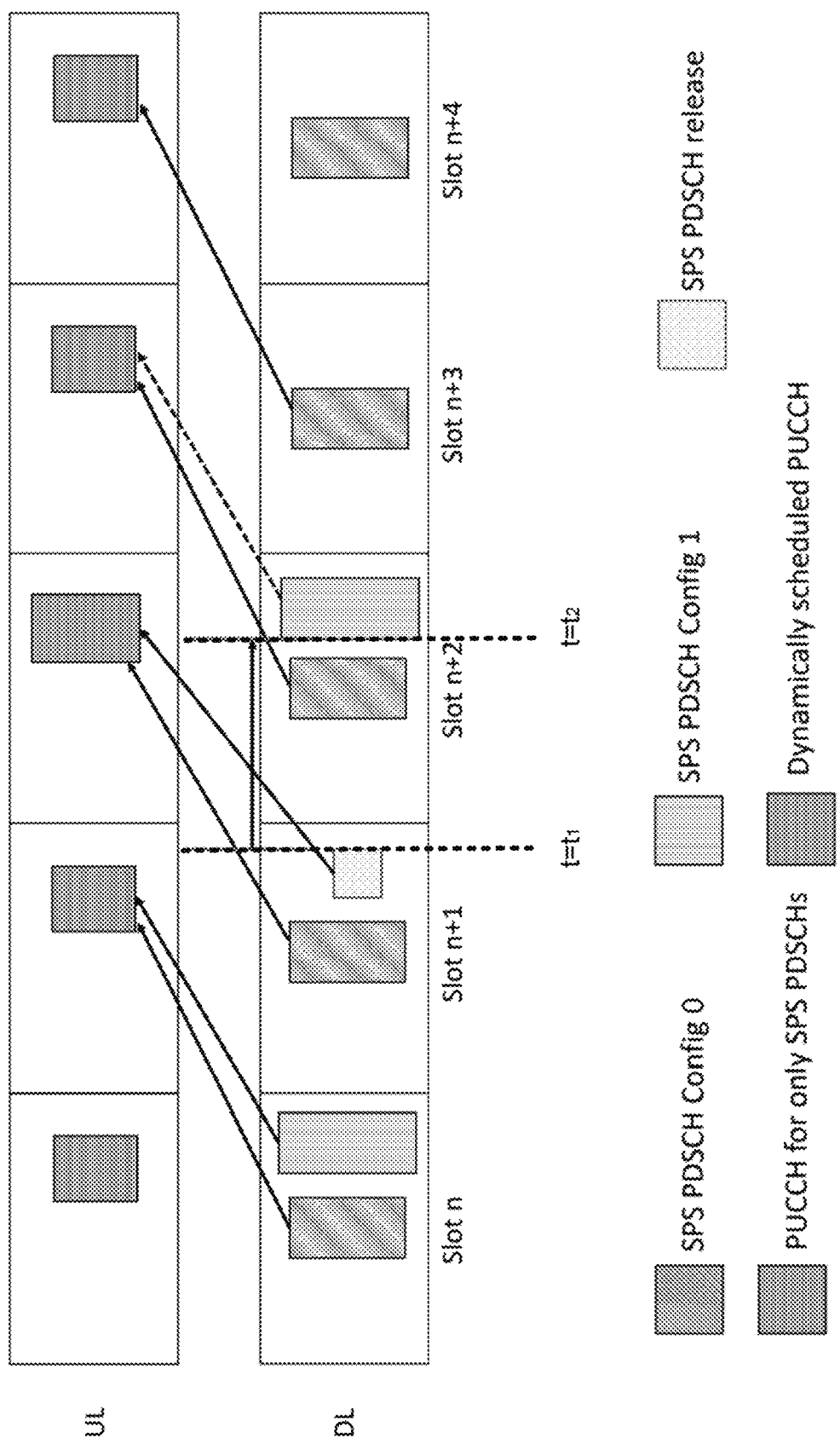

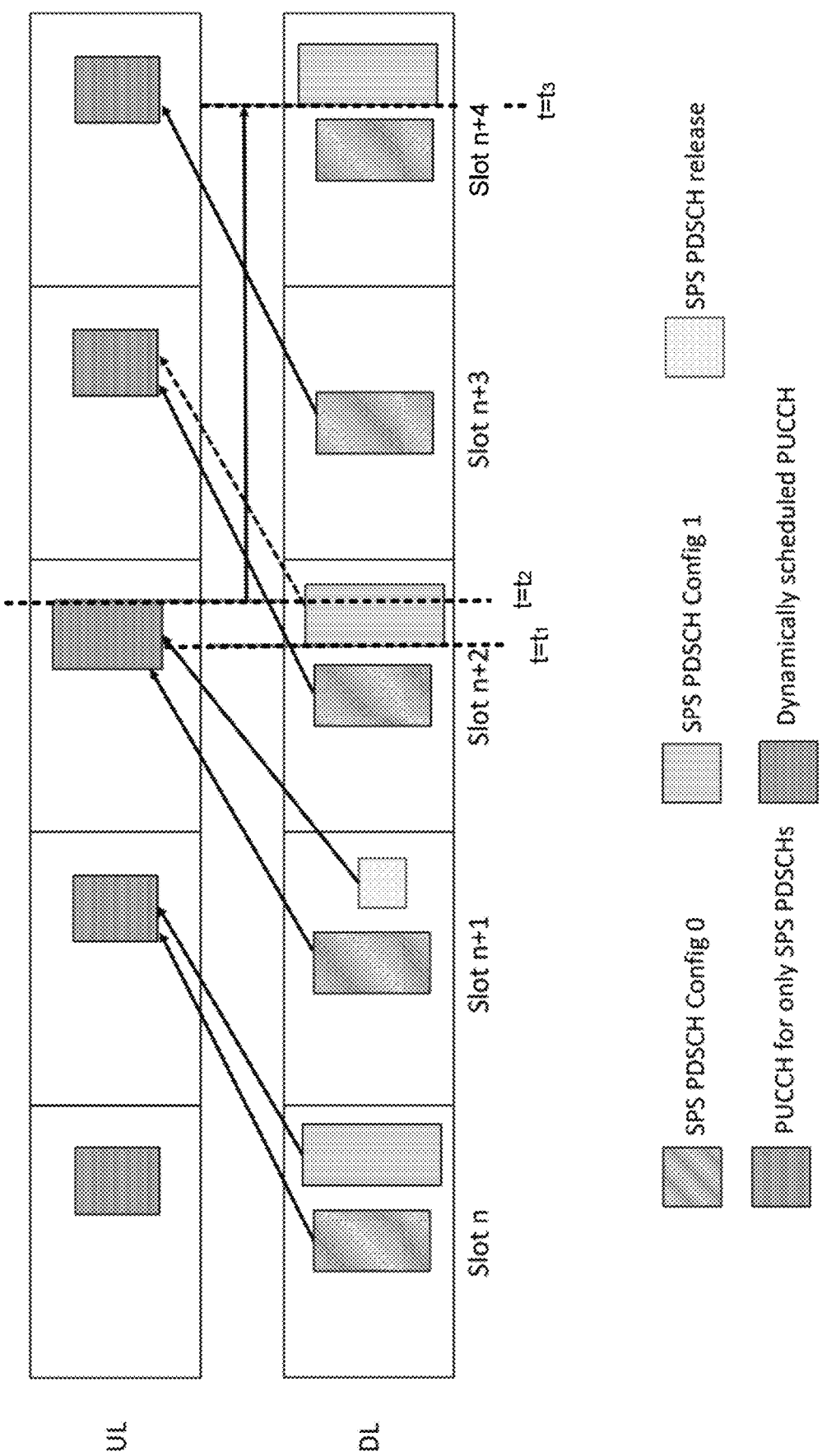

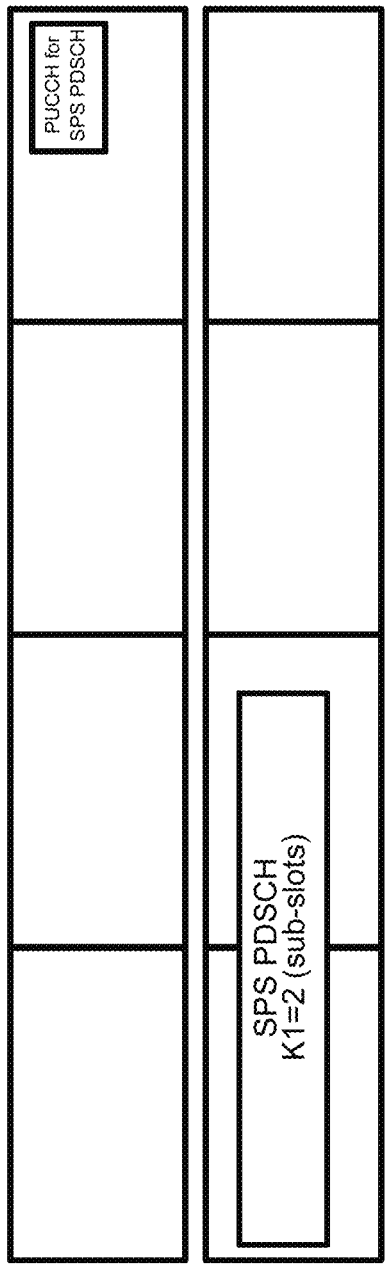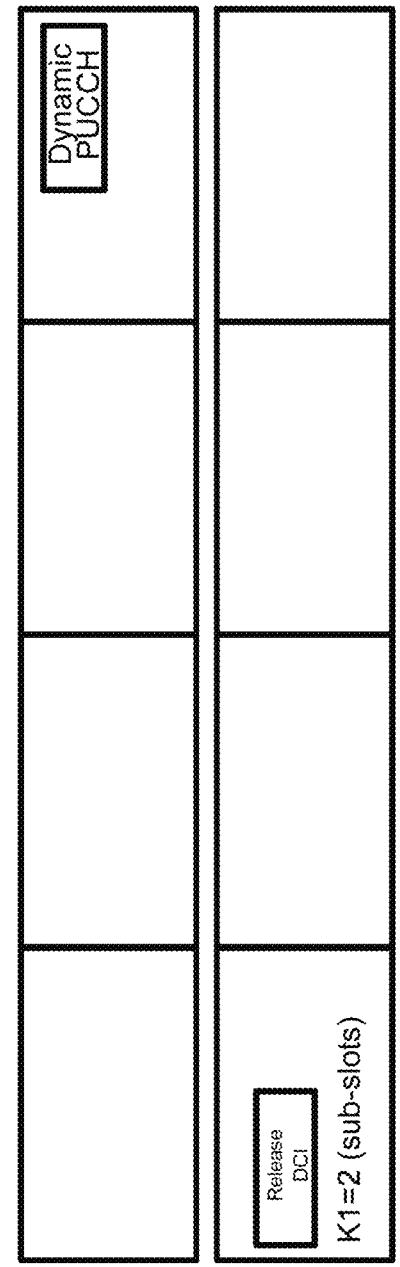
FIG. 7A
FIG. 7B

METHODS AND APPARATUSES FOR SPS HARQ-ACK TRANSMISSION

CROSS-REFERENCE TO RELATED APPLICATION(S)

The present disclosure claims the benefit of and priority of provisional U.S. Patent Application Ser. No. 62/961,414, filed on Jan. 15, 2020, entitled "Method and Apparatus for SPS HARQ-ACK transmission" (hereinafter "the '414 provisional"). The disclosure of the '414 provisional is hereby incorporated fully by reference into the present disclosure for all purposes.

FIELD

The present disclosure is related to wireless communication, and more particularly, to methods and apparatuses for Semi-Persistent Scheduling (SPS) Hybrid Automatic Repeat reQuest—Acknowledgement (HARQ-ACK) transmission.

BACKGROUND

In the 3rd generation Partnership Project (3 GPP) Release-15 (Rel-15) New Radio (NR), only one SPS configuration can be configured in a cell group to support periodic traffic such as Voice over Internet Protocol (VoIP) and the smallest periodicity of a SPS configuration is 10 ms. A HARQ-ACK for an SPS PDSCH may not be transmitted if a SPS PDSCH release is received, and there is no ambiguity with regard to whether the SPS configuration should be released and whether a HARQ-ACK for an SPS PDSCH should be transmitted on a PUCCH configured for the SPS PDSCH.

In the 3GPP Release-16 NR, time sensitive networking (TSN) use cases are to be supported. To support multiple TSN flows simultaneously, it is agreed that multiple SPS configurations are supported in a Band Width Part (BWP) for a user equipment (UE) to reduce PDCCH overhead. In addition, the smallest periodicity of an SPS configuration can be reduced to slot level to better support TSN flows with short periodicity. It is also agreed that multiple SPS configurations can be jointly released by using a single release DCI. The release DCI indicates a state which is mapped to a number of SPS configurations. The SPS configurations mapped to each state are determined by an RRC configuration.

When multiple SPS configurations are configured, however, for a HARQ-ACK feedback transmission on a PUCCH resource only for SPS PDSCHs without a corresponding PDCCH or for a HARQ-ACK feedback transmission multiplexed on a dynamically scheduled PUCCH with a Type 2 HARQ-ACK codebook, the HARQ-ACK codebook size for SPS PDSCHs without corresponding PDCCHs is dependent on the number of active SPS configurations with SPS PDSCH reception occasions located K1 slots from the PUCCH slot. In addition, the PUCCH resource is further determined based on the HARQ-ACK codebook size for a HARQ-ACK feedback transmission on a PUCCH resource only for SPS PDSCHs without a corresponding PDCCH. As such, it is important for the UE to have the same understanding of the number of active SPS configurations as the base station in case some of the SPS configurations are released.

Thus, there is a need in the art for substantially eliminating HARQ-ACK codebook size ambiguity.

SUMMARY

The present disclosure is related to methods and apparatuses for SPS HARQ-ACK transmission.

In a first aspect of the present disclosure, a method by a user equipment (UE) is provided. The method includes receiving a radio resource control (RRC) configuration carrying a configuration for a first downlink (DL) channel and an uplink (UL) channel; receiving the first DL channel and a second DL channel; and canceling the UL channel when a timing condition between the first DL channel and the second DL channel is satisfied.

According to an implementation of the first aspect, the timing condition is that the second DL channel is received no later than the first DL channel.

According to another implementation of the first aspect, the first DL channel overlaps the second DL channel in a time domain.

According to yet another implementation of the first aspect, the first DL channel is a semi-persistent scheduling (SPS) physical downlink shared channel (PDSCH) configured by one of one or more SPS configurations; the UL channel is a physical uplink control channel (PUCCH) for hybrid automatic repeat request acknowledgement (HARQ-ACK) feedback of the SPS PDSCH; and the second DL channel is a physical downlink control channel (PDCCH) carrying an SPS PDSCH release of one or more of the SPS configurations.

According to yet another implementation of the first aspect, the SPS PDSCH release is carried in a downlink control information (DCI) format.

According to yet another implementation of the first aspect, the timing condition is that a last symbol of the PDCCH is received not after a last symbol of the SPS PDSCH in a slot.

In a second aspect of the present disclosure, a UE is provided. The UE includes one or more non-transitory computer-readable media storing computer-executable instructions for scheduling radio resources for the UE; and at least one processor coupled to the one or more non-transitory computer-readable media, and configured to execute the computer-executable instructions to: receive a radio resource control (RRC) configuration carrying a configuration for a first downlink (DL) channel and an uplink (UL) channel; receive the first DL channel and a second DL channel; and cancel the UL channel when a timing condition between the first DL channel and the second DL channel is satisfied.

According to an implementation of the second aspect, the timing condition is that the second DL channel is received no later than the first DL channel.

According to another implementation of the second aspect, the first DL channel overlaps the second DL channel in a time domain.

According to yet another implementation of the second aspect, the first DL channel is a semi-persistent scheduling (SPS) physical downlink shared channel (PDSCH) configured by one of one or more SPS configurations; the UL channel is a physical uplink control channel (PUCCH) for hybrid automatic repeat request acknowledgement (HARQ-ACK) feedback of the SPS PDSCH; and the second DL channel is a physical downlink control channel (PDCCH) carrying an SPS PDSCH release of one or more of the SPS configurations.

According to yet another implementation of the second aspect, the SPS PDSCH release is carried in a downlink control information (DCI) format.

According to yet another implementation of the second aspect, the timing condition is that a last symbol of the PDCCH is received not after a last symbol of the SPS PDSCH in a slot.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

FIG. 2A and FIG. 2B illustrate an example of a HARQ-ACK codebook size ambiguity caused by the uncertainty of whether UE transmits a HARQ-ACK for an SPS configuration in a configured PUCCH in subsequent slots after a HARQ-ACK for an SPS PDSCH release is transmitted, in accordance with example implementations of the present disclosure.

FIG. 3 illustrates a flowchart of a method performed by a UE for an SPS HARQ-ACK transmission, in accordance with an implementation of the present disclosure.

FIG. 4A, FIG. 4B, FIG. 4C, and FIG. 4D each illustrate an example timeline for determining whether a HARQ-ACK for an SPS PDSCH should be transmitted in a configured PUCCH, according to example implementations of the present disclosure.

FIG. 7A illustrates an example PUCCH resource indication for a HARQ-ACK for an SPS PDSCH release, in accordance with an example implementation of the present disclosure.

FIG. 7B illustrates an example PUCCH resource indication for a HARQ-ACK for an SPS PDSCH release, in accordance with an example implementation of the present disclosure.

DESCRIPTION

Figure 1:
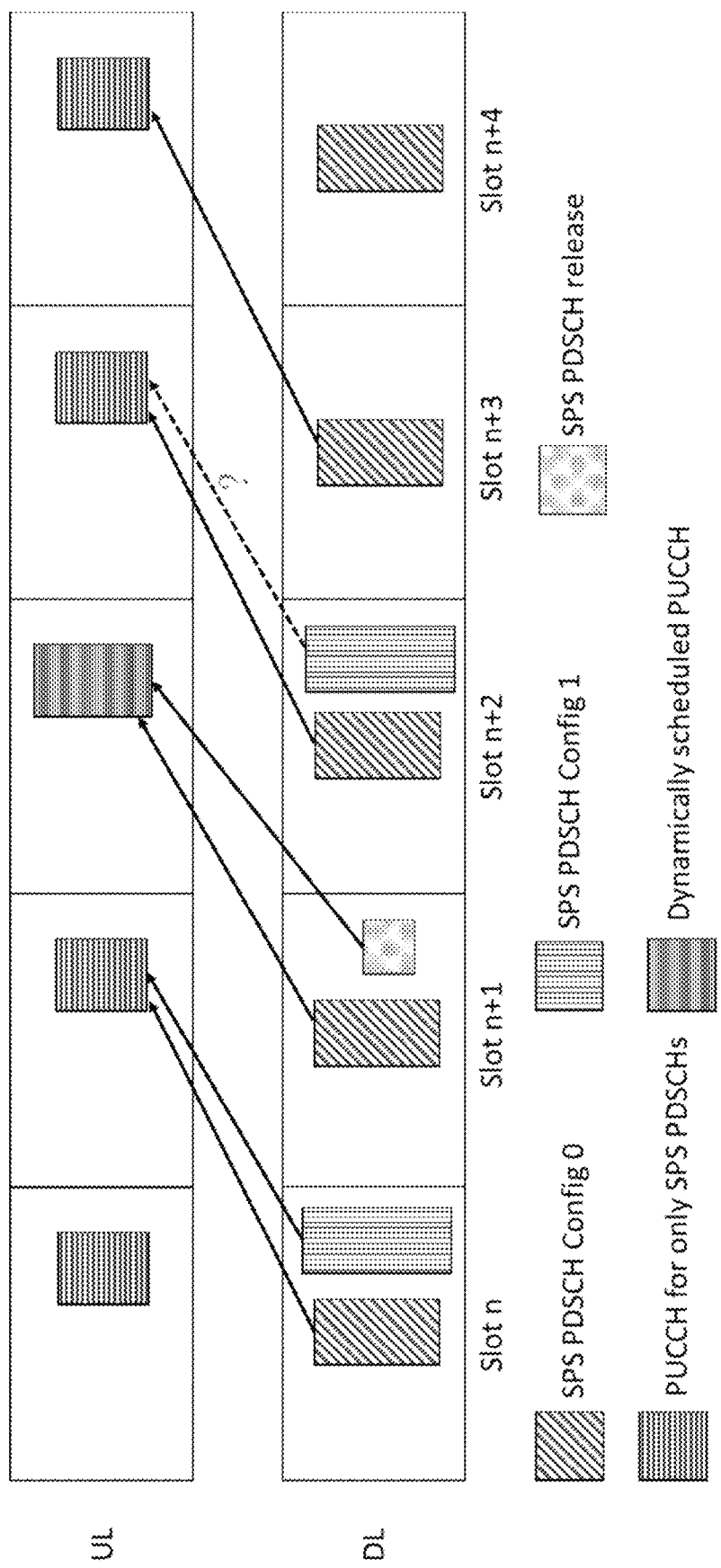
FIG. 1 illustrates an example of a HARQ-ACK codebook size ambiguity.

The acronyms used in the present disclosure are defined as follows. Unless otherwise specified, the acronyms have the following meanings.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

In various implementations of the present disclosure, for an SPS PDSCH reception ending in slot n, a UE may transmit a PUCCH in slot n+k where k is provided by a PDSCH-to-HARQ_feedback timing indicator field, if present, in a DCI format activating the SPS PDSCH reception.

For reporting a HARQ-ACK for an SPS PDSCH of multiple SPS configurations on a PUCCH configured for an SPS HARQ-ACK, multiple PUCCH resources are configured by an SPS-PUCCH-AN-List per HARQ-ACK codebook, and the actual PUCCH resource to be used among PUCCH resources is determined based on HARQ-ACK payload size. In this case, the HARQ-ACK bit order for an SPS PDSCH reception without a corresponding PDCCH is determined in an ascending order of DL slot per {SPS configuration index, serving cell index}, and then in an ascending order of SPS configuration index per {serving cell index}, and then in an ascending order of serving cell index.

For reporting a HARQ-ACK for an SPS PDSCH of a HARQ-ACK codebook in a first configured PUCCH in a slot, it is multiplexed with a HARQ-ACK of the same HARQ-ACK codebook in a second PUCCH in the slot corresponding to a dynamically scheduled PDSCH or an SPS release scheduled by a DCI, where the first PUCCH is overlapping with the second PUCCH determined based on the DCI. The HARQ-ACK codebook used for an SPS configuration is determined by an RRC parameter (i.e., harq-CodebookID-r16) configured in the SPS configuration.

If a Type 1 HARQ-ACK codebook is used for reporting a HARQ-ACK for the SPS configurations, the HARQ-ACK bit location (the location within an HARQ-ACK codebook) for an SPS PDSCH is derived based on a TDRA table row index and K1 indicated in the activation DCI. The HARQ-ACK bit location for an SPS PDSCH release with a separate release DCI (a DCI that releases one SPS configuration) is derived based on a TDRA table row index indicated in the activation DCI and K1 indicated in the release DCI. The HARQ-ACK bit location for an SPS PDSCH release with a joint release DCI is derived based on a TDRA table row index indicated in the activation DCI for an SPS PDSCH with the lowest SPS configuration index among the jointly released configurations and K1 indicated in the release DCI.

On the other hand, if a Type 2 HARQ-ACK codebook is used for reporting a HARQ-ACK for the SPS configurations, the HARQ-ACK bit order for an SPS PDSCH release with a separate/joint release DCI is derived based on a Downlink Assignment Index (DAI) and K1 indicated in the release DCI. The HARQ-ACK bit location within a HARQ-ACK codebook for an SPS PDSCH with an associated PDCCH is derived based on a DAI and K1 indicated in the activation DCI. The HARQ-ACK bits for an SPS PDSCH without a corresponding PDCCH is appended after HARQ-ACK bits for dynamically scheduled PDSCHs and/or for an SPS PDSCH release, and the HARQ-ACK bit order is determined in an ascending order of DL slot per {SPS configuration index, serving cell index}, and then in an ascending order of SPS configuration index per {serving cell index}, and then in an ascending order of serving cell index.

For the case that an SPS HARQ-ACK is transmitted on a configured PUCCH only for the SPS HARQ-ACK and for the case that an SPS HARQ-ACK is multiplexed in a Type 2 HARQ-ACK codebook transmitted in a dynamically scheduled PUCCH, the HARQ-ACK codebook size depends on the number of activated SPS configurations. There may be cases where the number of activated SPS configurations is ambiguous as discussed below.

A TDRA table used for PDSCH resource allocation may be provided by a pdsch-TimeDomainAllocationList or a pdsch-TimeDomainAllocationListForDCI-Format1-2-r16.

PDCCH Validation for DL SPS

A UE may validate, for scheduling activation or scheduling release, a DL SPS assignment PDCCH or a configured UL grant Type 2 PDCCH if:
  the CRC of a corresponding DCI format is scrambled with a CS-RNTI provided by cs-RNTI, and
  the new data indicator field in the DCI format for the enabled transport block is set to '0'.

If a UE is provided a single configuration for an SPS PDSCH, validation of the DCI format is achieved if all fields for the DCI format are set according to Table 1-1 or Table 1-2.

TABLE 1-1

Special fields for single DL SPS scheduling activation PDCCH validation when a UE is provided a single SPS configuration in the active DL BWP of the scheduled cell

|  | DCI Format 1_0 or 1_2 | DCI Format 1_1 |
|---|---|---|
| HARQ process number | set to all '0's | set to all '0's |
| Redundancy version | set to all '0's | For the enabled transport block: set to all '0's |

TABLE 1-2

Special fields for single DL SPS scheduling release PDCCH validation when a UE is provided a single SPS configuration in the active DL BWP of the scheduled cell

|  | DCI format 1_0 or 1_1 or 1_2 |
|---|---|
| HARQ process number | set to all '0's |
| Redundancy version | set to all '0's |
| Modulation and coding scheme | set to all '1's |
| Frequency domain resource assignment | set to all '0's for FDRA Type 0 or for dynamicSwitch set to all '1's for FDRA Type 1 |

If a UE is provided more than one configurations for an SPS PDSCH, a value of the HARQ process number field in a DCI format indicates an activation for a corresponding SPS configuration with a same value as provided by SPSConfig-index. Validation of the DCI format is achieved if the RV field for the DCI format is set as in Table 1-3.

TABLE 1-3

Special fields for a single DL SPS scheduling activation PDCCH validation when a UE is provided multiple DL SPS configurations in the active DL/UL BWP of the scheduled cell

|  | DCI Format 1_0 or 1_2 | DCI Format 1_1 |
|---|---|---|
| Redundancy version | set to all '0's | For the enabled transport block: set to all '0's |

If a UE is provided more than one configuration for an SPS PDSCH,
  if the UE is provided an sps-ConfigDeactivationStateList, a value of the HARQ process number field in a DCI format indicates a corresponding entry for scheduling release of one or more SPS configurations;
  if the UE is not provided sps-ConfigDeactivationStateList, a value of the HARQ process number field in a DCI format indicates a release for a corresponding SPS configuration with a same value as provided by by SPSconfig-index.

Validation of the DCI format is achieved if all fields for the DCI format are set according to Table 1-4.

TABLE 1-4

Special fields for a single or multiple DL SPS scheduling release PDCCH validation when a UE is provided multiple DL SPS configurations in the active DL BWP of the scheduled cell

|  | DCI Format 1_0 or 1_1 or 1_2 |
|---|---|
| Redundancy version | set to all '0's |
| Modulation and coding scheme | set to all 'Ps |
| Frequency domain resource assignment | set to all '0's for FDRA Type 0 or for dynamicSwitch set to all '1's for FDRA Type 1 |

If validation is achieved, the UE considers the information in the DCI format as a valid activation or valid release of DL SPS. If validation is not achieved, the UE discards all the information in the DCI format.

A UE is expected to provide HARQ-ACK information in response to an SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N=5 for $\mu=0$, N=5.5 for $\mu=1$, and N=11 for $\mu=2$, otherwise, N=10 for $\mu=0$, N=12 for $\mu=1$, N=22 for $\mu=2$, and N=25 for $\mu=3$, wherein $\mu$ corresponds to the smallest SCS configuration between the SCS configuration of the PDCCH providing the SPS PDSCH release and the SCS configuration of a PUCCH carrying the HARQ-ACK information in response to an SPS PDSCH release.

HARQ-ACK Codebook Size Ambiguity

FIG. 1 illustrates an example of a HARQ-ACK codebook size ambiguity. In FIG. 1, it is assumed that SPS configuration 0 is configured with periodicity of 1 slot and K1 equals to 1, SPS configuration 1 is configured with periodicity of 1 slot and K1 equals to 1. However, if an SPS PDSCH release DCI is transmitted in slot n+1 for releasing SPS configuration 1, it is not clear whether SPS configuration 1 has been released in slot n+2. That is, whether HARQ-ACK for an SPS PDSCH reception of SPS configuration 1 in slot n+2 should be generated or not is not clear. Therefore, it is ambiguous whether the HARQ-ACK codebook size for a PUCCH transmission in slot n+3 is 1 or 2 bits.

Due to the introduction of the above feature (joint release) in Rel-16 NR, it is possible to indicate a release of an SPS configuration which has a corresponding PUCCH configured in slot (or sub-slot) n+1, when a release DCI has a corresponding HARQ-ACK feedback in slot (or sub-slot) n. In this case, a rule should be defined for the UE to determine whether to transmit HARQ-ACK for an SPS configuration in the configured PUCCH in subsequent slots after a HARQ-ACK for an SPS PDSCH release is transmitted.

FIG. 2A and FIG. 2B illustrate an example of a HARQ-ACK codebook size ambiguity caused by the uncertainty of whether UE transmits a HARQ-ACK for an SPS configuration in a configured PUCCH in subsequent slots after a HARQ-ACK for an SPS PDSCH release is transmitted, in accordance with example implementations of the present disclosure.

In FIG. 2A, configurations for the example is illustrated. There are three SPS configurations. For SPS configuration 0, the periodicity is 2 slots and K1 is 1. For SPS configuration 1, the periodicity is 1 slot and K1 is 1. For SPS configuration 2, the periodicity is 2 slots and K1 is 2. The SPS PDSCH and PUCCH configured for transmission of a HARQ-ACK for an SPS PDSCH occurs periodically. Four slots of the resources are shown in FIG. 2A.

In FIG. 2B, an SPS PDSCH release is transmitted in the first slot, indicating to release SPS configuration 0 and SPS configuration 2. In the example shown in FIG. 2B, a HARQ-ACK for an SPS PDSCH release of the SPS configuration 0 and SPS configuration 2 is scheduled in the second slot, and a HARQ-ACK for an SPS PDSCH of the SPS configuration 1 is multiplexed with the HARQ-ACK for the SPS PDSCH release.

In this example, there is an ambiguity in the HARQ-ACK codebook size for the configured PUCCH in the third slot. That is, it is not clear whether the UE should receive an SPS PDSCH of SPS configuration 2 in the first slot and transmit the corresponding HARQ-ACK in the third slot.

Solutions to HARQ-ACK Codebook Size Ambiguity

In various implementations of the present disclosure, to determine whether a HARQ-ACK for an SPS PDSCH should be transmitted in a configured PUCCH, a timeline is defined for an SPS PDSCH release DCI and an SPS PDSCH of an SPS configuration released by the DCI. If an SPS PDSCH release DCI is received before an SPS PDSCH of the SPS configuration released by the SPS PDSCH release DCI, the HARQ-ACK for the SPS PDSCH is not transmitted. The SPS PDSCH release DCI may or may not overlap with the SPS PDSCH.

In one approach, if an SPS PDSCH starts later than a time duration after the end of SPS PDSCH release DCI indicating a release of the corresponding SPS configuration, then the HARQ-ACK for the SPS PDSCH is not transmitted.

For the value of the time duration, it may be defined as the requirement of processing time for a HARQ-ACK transmission for an SPS PDSCH release, i.e., the time duration is N symbols as specified in 3GPP TS 38.213 v15.7.0. The content of 3GPP TS 38.213 v15.7.0 is hereby incorporated by reference in its entirety. More specifically, the UE does not provide HARQ-ACK information for an SPS PDSCH if the starting symbol of the SPS PDSCH starts after N symbols from the last symbol of a PDCCH providing an SPS PDSCH release indicating a release of the SPS configuration of the SPS PDSCH. For UE processing capability 1 and for the SCS of the PDCCH reception, N=10 for 15 kHz, N=12 for 30 kHz, N=22 for 60 kHz, and N=25 for 120 kHz. For a UE with capability 2 in FR1 and for the SCS of the PDCCH reception, N=5 for 15 kHz, N=5.5 for 30 kHz, and N=11 for 60 kHz.

Method 1

To determine whether a HARQ-ACK for an SPS PDSCH should be transmitted in a configured PUCCH, a timeline (having certain timing conditions) is defined.

FIG. 3 illustrates a flowchart 300 of a method performed by a UE for an SPS HARQ-ACK transmission, in accordance with an implementation of the present disclosure. The flowchart 300 includes actions 302, 304, and 306.

In action 302, the UE may receive an RRC configuration carrying a configuration for a first DL channel and a UL channel. In the present implementation, the first DL channel is an SPS PDSCH configured by one of one or more SPS configurations. The UL channel is a PUCCH for a HARQ-ACK feedback of the SPS PDSCH.

In action 304, the UE may receive the first DL channel and a second DL channel. The second DL channel is a PDCCH carrying an SPS PDSCH release of one or more of the SPS configurations. In one implementation, the first DL channel overlaps the second DL channel in the time domain. In one implementation, the SPS PDSCH release is carried in a DCI format.

In action 306, the UE may cancel the UL channel when a timing condition between the first DL channel and the second DL channel is satisfied. In one implementation, the timing condition is that the second DL channel is received no later than the first DL channel. For example, the timing condition is that a last symbol of the PDCCH is received not after a last symbol of the SPS PDSCH in a slot.

In a first implementation of Method 1, if an SPS PDSCH starts later than a time duration (after the end) of an SPS PDSCH release (e.g., DCI) indicating a release of the corresponding SPS configuration, then the HARQ-ACK for the SPS PDSCH is not transmitted.

FIG. 4A illustrates an example timeline for determining whether a HARQ-ACK for an SPS PDSCH should be transmitted in a configured PUCCH, according to an example implementation of the present disclosure. With reference to FIG. 4A, an SPS PDSCH (e.g., in Slot n+2) starts at $t=t_2$, which is after the end of an SPS PDSCH release at $t=t_1$ (e.g., in Slot n+1) indicating a release of the corresponding SPS configuration. Thus, the HARQ-ACK for the SPS PDSCH is not transmitted.

For the value of the time duration, it may be defined as the requirement of processing time for a HARQ-ACK transmission for an SPS PDSCH release, i.e., the value of the time duration is equal to the time duration of N symbols as specified in TS 38.213 v15.7.0. More specifically, a UE does not provide HARQ-ACK information for an SPS PDSCH if the starting symbol of the SPS PDSCH starts after N symbols from the last symbol of a PDCCH providing SPS PDSCH release indicating a release of the SPS configuration of the SPS PDSCH. For UE processing capability 1 and for the SCS of the PDCCH reception, N=10 for 15 kHz, N=12 for 30 kHz, N=22 for 60 kHz, and N=25 for 120 kHz. For a UE with capability 2 in FR1 and for the SCS of the PDCCH reception, N=5 for 15 kHz, N=5.5 for 30 kHz, and N=11 for 60 kHz.

In one approach, the value of the time duration may be defined as the requirement of PUSCH preparation time, i.e., the time duration is $T_{proc,2} = \max((N_2 + d_{2,1})(2048 + 144) \cdot \kappa 2^{-\mu} \cdot T_C, d_{2,2})$ as specified in TS 38.214 v15.7.0. In one approach, $d_{2,1}$ is set to 0 since there is no actual PUSCH transmission. For determination of $N_2$, it is based on the subcarrier spacing corresponding to the one of (μPDCCH, μPDSCH) resulting with the largest $T_{proc,2}$, where the μPDCCH corresponds to the subcarrier spacing of the downlink with which the PDCCH carrying the SPS PDSCH release DCI was transmitted and μPDSCH corresponds to the subcarrier spacing of the PDSCH with which the SPS PDSCH was transmitted.

In one approach, the $N_2$ corresponding to UE processing capability 2 is applied if the high layer parameter processingType2Enabled in PUSCH-ServingCellConfig is configured for the cell and set to enable. Otherwise, $N_2$ corresponding to UE processing capability 1 is applied. In one approach, $N_2$ corresponding to UE processing capability 2 is applied regardless of higher layer configuration.

In one approach, the value of the time duration is defined as the time duration of 14 symbols. That is, if an SPS PDSCH starts after 14 symbols after the end of an SPS PDSCH release DCI indicating a release of the corresponding SPS configuration, then the HARQ-ACK for the SPS PDSCH is not transmitted.

In one approach, the value of the time duration is defined as the time duration of 0 symbol. In other words, if an SPS PDSCH starts after the ending symbol of the SPS PDSCH release DCI indicating a release of the corresponding SPS configuration, then the HARQ-ACK for the SPS PDSCH is not transmitted.

In a second implementation of Method 1, if a PUCCH for a HARQ-ACK transmission of an SPS PDSCH starts later than a time duration after the end of SPS PDSCH release DCI indicating a release of the corresponding SPS configuration, then the HARQ-ACK for the SPS PDSCH is not transmitted.

Figure 4B:
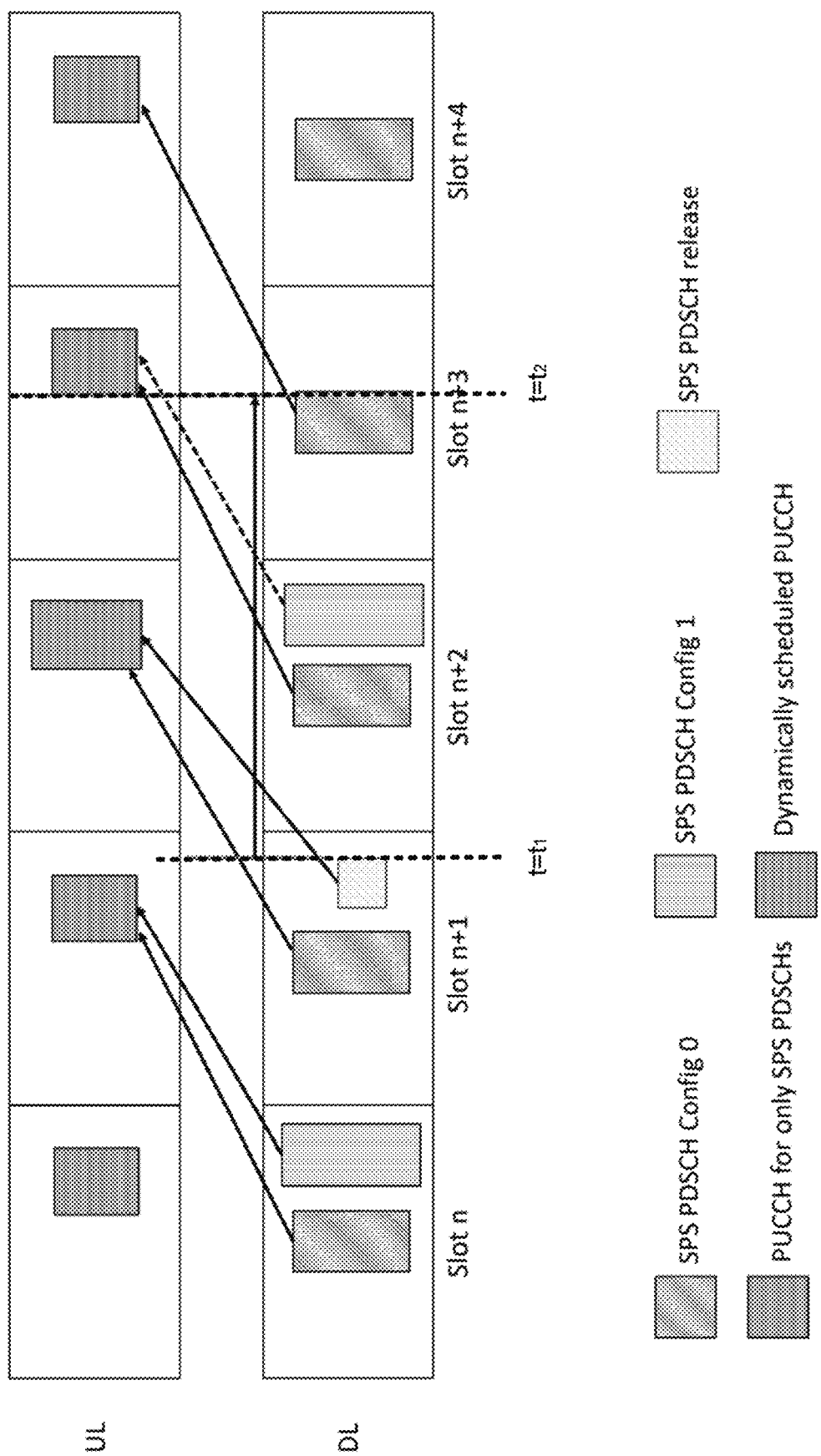

FIG. 4B illustrates an example timeline for determining whether a HARQ-ACK for an SPS PDSCH should be transmitted in a configured PUCCH, according to an example implementation of the present disclosure. With reference to FIG. 4B, a PUCCH for a HARQ-ACK transmission of an SPS PDSCH (e.g., in Slot n+3) starts at $t=t_2$, which is later than the end of an SPS PDSCH release DCI at $t=t_1$ (e.g., in Slot n+1) indicating a release of the corresponding SPS configuration. Thus, the HARQ-ACK for the SPS PDSCH is not transmitted.

For the value of the time duration, it may be defined as the requirement of processing time for a HARQ-ACK transmission for an SPS PDSCH release, i.e., the value of the time duration is equal to the time duration of N symbols as specified in TS 38.213 v15.7.0. More specifically, a UE does not provide HARQ-ACK information for an SPS PDSCH if the starting symbol of the PUCCH for a HARQ-ACK transmission of the SPS PDSCH starts after N symbols from the last symbol of a PDCCH providing SPS PDSCH release indicating a release of the SPS configuration of the SPS PDSCH. For UE processing capability 1 and for the SCS of the PDCCH reception, N=10 for 15 kHz, N=12 for 30 kHz, N=22 for 60 kHz, and N=25 for 120 kHz. For a UE with capability 2 in FR1 and for the SCS of the PDCCH reception, N=5 for 15 kHz, N=5.5 for 30 kHz, and N=11 for 60 kHz. In one approach, the SCS for determination of N is based on the smallest SCS among the SCS of the SPS PDSCH release DCI and the SCS of the PUCCH for a HARQ-ACK transmission for the SPS PDSCH.

In one approach, the value of the time duration may be defined as the requirement of PUCCH overriding timeline, i.e., the value of the time duration is equal to the time duration of $N_3$ symbols as specified in TS 38.213 v15.7.0. More specifically, a UE does not provide HARQ-ACK information for an SPS PDSCH if the starting symbol of the PUCCH for a HARQ-ACK transmission of the SPS PDSCH starts after $N_3$ symbols from the last symbol of a PDCCH providing an SPS PDSCH release indicating a release of the SPS configuration of the SPS PDSCH. It is noted that if the PUCCH for a HARQ-ACK transmission for other SPS PDSCH not released by the SPS PDSCH release DCI is changed due to not transmitting the HARQ-ACK for the released SPS PDSCH, the starting symbol of the PUCCH determined based on the HARQ-ACK codebook size without the HARQ-ACK for the released SPS PDSCH should start after $N_3$ symbols from the last symbol of the SPS PDSCH release DCI.

In one approach, the value of the time duration may be defined as the requirement of PUSCH preparation time, i.e., the time duration is $T_{proc,2}=\max((N_2+d_{2,1})(2048+144)\cdot\kappa 2^{-\mu}\cdot T_C, d_{2,2})$ as specified in TS 38.214 v15.7.0. In one approach, $d_{2,1}$ is set to 0 since there is no actual PUSCH transmission. For determination of $N_2$, it is based on the subcarrier spacing corresponding to the one of (μPDCCH, μPUCCH) resulting with the largest $T_{proc,2}$, where the μPDCCH corresponds to the subcarrier spacing of the downlink with which the PDCCH carrying the SPS PDSCH release DCI was transmitted and μPUCCH corresponds to the subcarrier spacing of the PUCCH with which the HARQ-ACK for the SPS PDSCH was transmitted.

In one approach, the $N_2$ corresponding to UE processing capability 2 is applied if the high layer parameter processingType2Enabled in PUSCH-ServingCellConfig is configured for the cell and set to enable. Otherwise, $N_2$ corresponding to UE processing capability 1 is applied. In one approach, $N_2$ corresponding to UE processing capability 2 is applied regardless of higher layer configurations. It is noted that if the PUCCH for a HARQ-ACK transmission for other SPS PDSCH not released by the SPS PDSCH release DCI is changed due to not transmitting the HARQ-ACK for the released SPS PDSCH, the starting symbol of the PUCCH determined based on the HARQ-ACK codebook size without the HARQ-ACK for the released SPS PDSCH should start after $T_{proc,2}$ from the last symbol of the SPS PDSCH release DCI.

In one approach, the value of the time duration is defined as the time duration of 14 symbols.

In a third implementation of Method 1, if an SPS PDSCH starts later than a time duration (e.g., after the end) of a PUCCH for a transmission of a HARQ-ACK for an SPS PDSCH release (DCI) indicating a release of the corresponding SPS configuration, then the HARQ-ACK for the SPS PDSCH is not transmitted.

FIG. 4C illustrates an example timeline for determining whether a HARQ-ACK for an SPS PDSCH should be transmitted in a configured PUCCH, according to an example implementation of the present disclosure. With reference to FIG. 4C, an SPS PDSCH (e.g., in Slot n+4) starts at $t=t_3$, which is after the end of a PUCCH at $t=t_2$ (e.g., in Slot n+2) for a transmission of a HARQ-ACK for an SPS PDSCH release (DCI) indicating a release of the corresponding SPS configuration. Thus, the HARQ-ACK for the SPS PDSCH is not transmitted. It is noted that in Slot n+2, an SPS PDSCH starts at $t=t_1$, which is before the end of the PUCCH in Slot n+2 at $t=t_2$ for the transmission of the HARQ-ACK for the SPS PDSCH release. Thus, the HARQ-ACK for the SPS PDSCH in Slot n+2 may still be transmitted. By comparison, the SPS PDSCH in Slot n+4 starts at $t=t_3$, which is after the end of the PUCCH in Slot n+2 (e.g., at $t=t_2$). Thus, the HARQ-ACK for the SPS PDSCH in Slot n+3 is not transmitted.

For the value of the time duration, it may be defined as a time duration that is long enough for gNB to process the PUCCH for transmission of a HARQ-ACK for an SPS PDSCH release DCI. In one approach, the value of the time duration is defined as 3 ms. More specifically, if an SPS PDSCH has starting symbol that starts after slot+$3N_{slot}^{subframe,\mu}$, after the HARQ-ACK for the SPS PDSCH release DCI indicating a release of the corresponding SPS configuration is transmitted in slot n, then UE does not transmit the HARQ-ACK for the SPS PDSCH. In one approach, the value of the time duration is defined as the time duration of 14 symbols. In one approach, the value of the time duration is defined as 0 ms. That is, if an SPS PDSCH has starting symbol that starts after the ending symbol of the PUCCH for transmission of a HARQ-ACK for an SPS PDSCH release DCI indicating a release of the corresponding SPS configuration, then UE does not transmit the HARQ-ACK for the SPS PDSCH.

In a fourth implementation of Method 1, if a PUCCH for a HARQ-ACK transmission of an SPS PDSCH starts later than a time duration (after the end) of a PUCCH for a HARQ-ACK transmission for an SPS PDSCH release (DCI) indicating a release of the corresponding SPS configuration, then the HARQ-ACK for the SPS PDSCH is not transmitted.

Figure 4D:
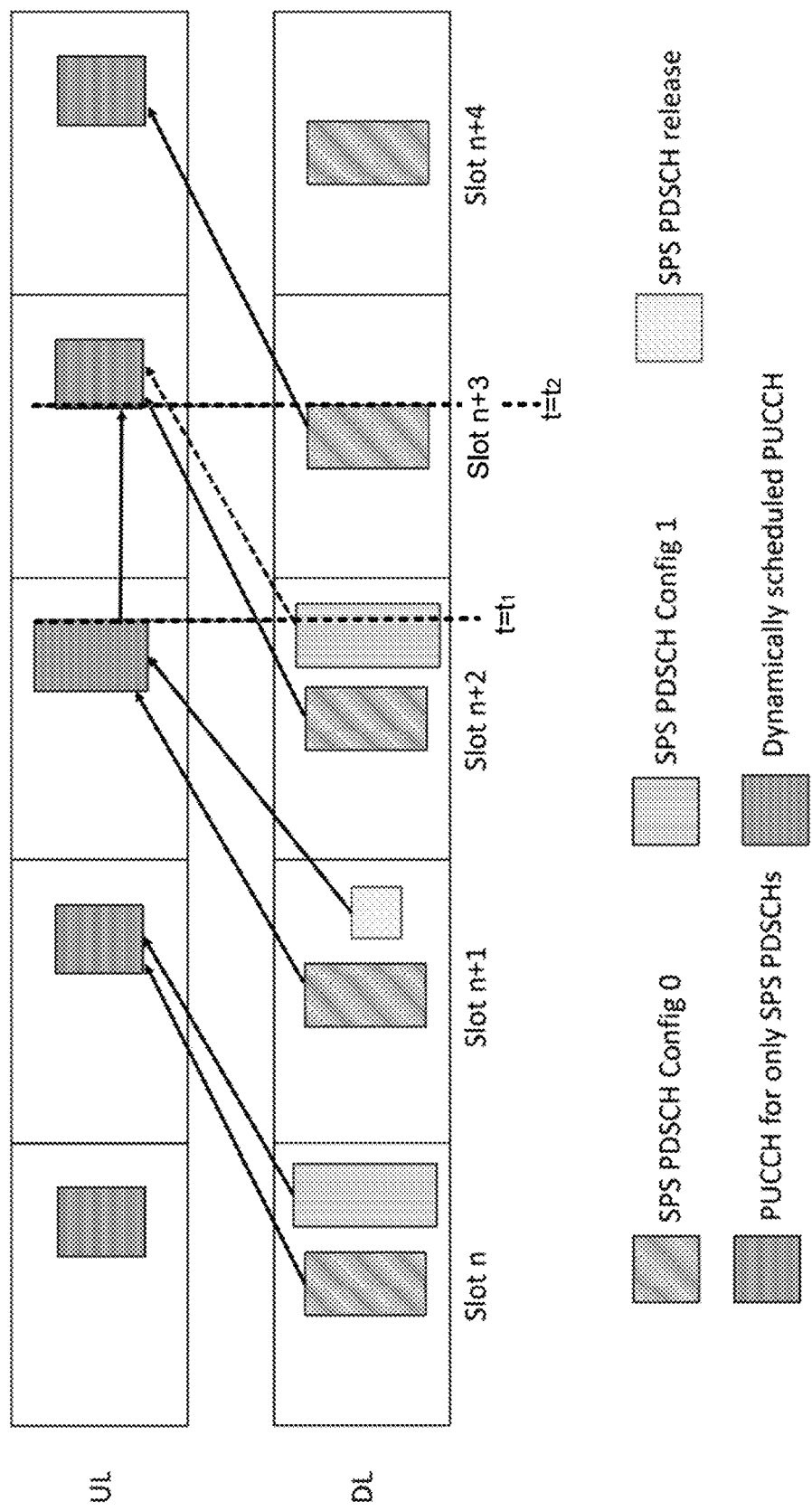

FIG. 4D illustrates an example timeline for determining whether a HARQ-ACK for an SPS PDSCH should be transmitted in a configured PUCCH, according to an example implementation of the present disclosure. With reference to FIG. 4D, a PUCCH (e.g., in Slot n+3) for a HARQ-ACK transmission of an SPS PDSCH starts at $t=t_2$, which is after the end of a PUCCH at $t=t_1$ (e.g., in Slot n+2) for a HARQ-ACK transmission for an SPS PDSCH release (DCI) indicating a release of the corresponding SPS configuration. Thus, the HARQ-ACK for the SPS PDSCH is not transmitted.

For the value of the time duration, it may be defined as a time duration that is long enough for gNB to process the PUCCH for transmission of a HARQ-ACK for an SPS PDSCH release DCI. In one approach, the value of the time duration is defined as 3 ms. More specifically, if the PUCCH for a HARQ-ACK transmission of an SPS PDSCH has a starting symbol that starts after slot $n+3N_{slot}^{subframe,\mu}$, after the HARQ-ACK for the SPS PDSCH release DCI indicating a release of the corresponding SPS configuration is transmitted in slot n, then UE does not transmit the HARQ-ACK for the SPS PDSCH. In one approach, the value of the time duration is defined as the time duration of 14 symbols. In one approach, the value of the time duration is defined as 0 ms. That is, if the PUCCH for a HARQ-ACK transmission of an SPS PDSCH has starting symbol that starts after the ending symbol of the PUCCH for transmission of a HARQ-ACK for an SPS PDSCH release DCI indicating a release of the corresponding SPS configuration, then UE does not transmit the HARQ-ACK for the SPS PDSCH.

In a fifth implementation of Method 1, if an SPS PDSCH is released by an SPS PDSCH release DCI and the SPS PDSCH starts later than a time duration after the end of an SPS PDSCH of the SPS configuration with lowest SPS configuration index that are released by the SPS PDSCH release DCI, then the HARQ-ACK for the SPS PDSCH is not transmitted.

In one approach, the value of the time duration is defined as the time duration of 0 symbol. In other words, if an SPS PDSCH starts after the ending symbol of another SPS PDSCH of the SPS configuration with lowest SPS configuration index which are jointly released by an SPS PDSCH release DCI, then the HARQ-ACK for the SPS PDSCH is not transmitted.

Method 2

To avoid the issue of HARQ-ACK codebook ambiguity, scheduling restriction is specified.

Figure 5:
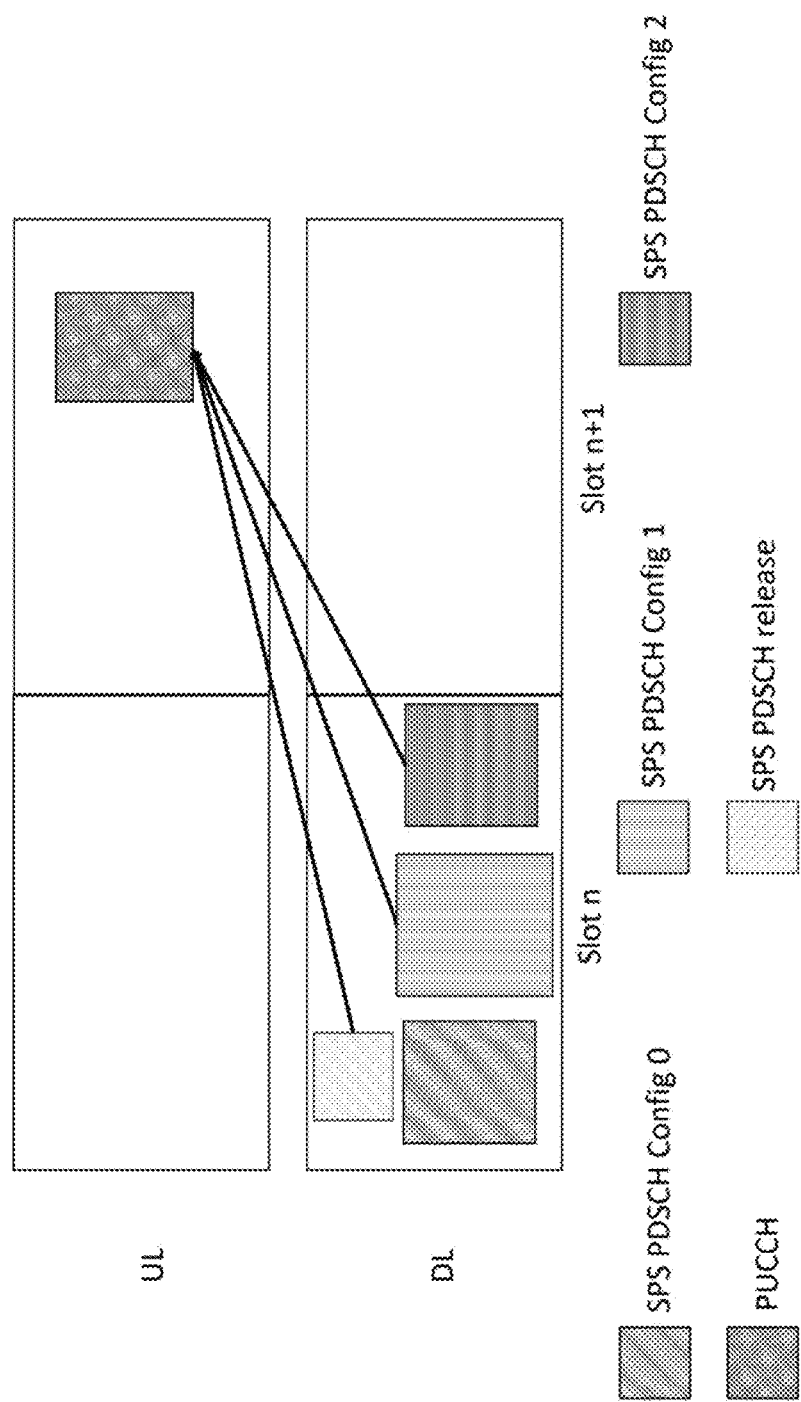
FIG. 5 illustrates an example restriction for avoiding HARQ-ACK codebook ambiguity, according to an example implementation of the present disclosure.

FIG. 5 illustrates an example restriction for avoiding HARQ-ACK codebook ambiguity, according to an example implementation of the present disclosure. In FIG. 5, it is restricted that an SPS PDSCH release DCI that jointly releases multiple SPS configurations can only indicate release of the SPS configurations that has a HARQ-ACK for an SPS PDSCH to be transmitted in the same slot or same sub-slot as the PUCCH for the HARQ-ACK transmission for the SPS PDSCH release DCI. In other words, the UE is not expected to be scheduled with an SPS PDSCH release DCI indicating a release of multiple SPS configurations with SPS PDSCH that does not have corresponding HARQ-ACK bit to be transmitted in the same slot or same sub-slot as the HARQ-ACK bit for the SPS PDSCH release DCI.

Referring back to FIGS. 2A and 2B, for example, if an SPS PDSCH release DCI is transmitted in the first slot and has a corresponding HARQ-ACK to be transmitted in the second slot, then the SPS PDSCH release DCI can indicate release of SPS configuration 0 and SPS configuration 1. With this restriction, there is no ambiguity of whether a HARQ-ACK for an SPS PDSCH of SPS configuration 2 should be transmitted in the third slot. For SPS configuration 1, since the HARQ-ACK for the SPS PDSCH release DCI indicating a release of SPS configuration 1 is transmitted in the second slot, it is clear the HARQ-ACK for the SPS PDSCH of SPS configuration 1 is not transmitted in the third slot, since the HARQ-ACK for the last SPS PDSCH occasions before SPS release DCI is received has been transmitted in the second slot. Therefore, no ambiguity of HARQ-ACK codebook size will occur if the scheduling restriction is followed.

HARQ-ACK Bit Collision

When constructing a Type 1 HARQ-ACK codebook, the number of HARQ-ACK bits for a slot is determined based on a Time Domain Resource Allocation (TDRA) table and a time domain duplex (TDD) configuration. A maximum number of non-overlapping PDSCH candidate positions in a slot is determined based on start and length indicators (SLIVs) in the TDRA table and the available symbols (DL or flexible symbols) in the slot, and the number of HARQ-ACK bits in the slot is the maximum number of non-overlapping PDSCH candidate positions in the slot, where each PDSCH candidate position of the PDSCH candidate positions that may be used to allocate the maximum number of non-overlapping PDSCHs or SPS PDSCHs has a corresponding HARQ-ACK bit. The HARQ-ACK bit location for a HARQ-ACK bit corresponding to a PDSCH or an SPS PDSCH in the slot is determined based on the SLIV for the PDSCH. Specifically, the HARQ-ACK bit location for a PDSCH or an SPS PDSCH using an SLIV is the same as the HARQ-ACK bit location for the HARQ-ACK bit corresponding to the PDSCH candidate position which is one of the PDSCH candidate positions that may be used to allocate the maximum number of non-overlapping PDSCHs or SPS PDSCHs in the slot if the PDSCH candidate position overlaps with the PDSCH or SPS PDSCH using the SLIV.

For a Type 1 HARQ-ACK codebook, a HARQ-ACK bit location for an SPS PDSCH release (DCI) is the same as the HARQ-ACK bit location for an SPS PDSCH of the SPS configuration released by the SPS PDSCH release DCI, which is determined based on the TDRA row index indicated in the activation DCI (which indicates an SLIV for the PDSCH). It is possible that two SPS configurations with different periodicities have the same HARQ-ACK bit location in the Type 1 HARQ-ACK codebook.

Figure 6A:
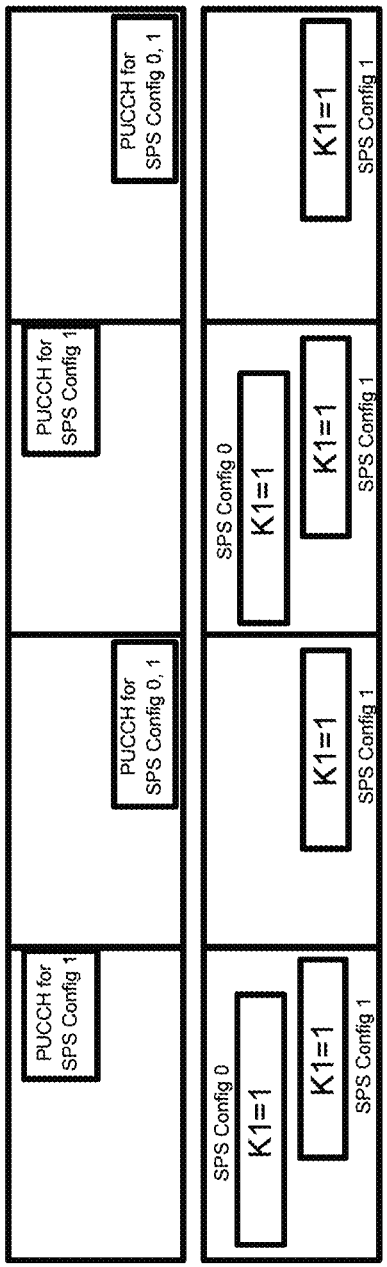
FIG. 6A and FIG. 6B illustrate an example of HARQ-ACK bit collision, in accordance with example implementations of the present disclosure.
Figure 6B:
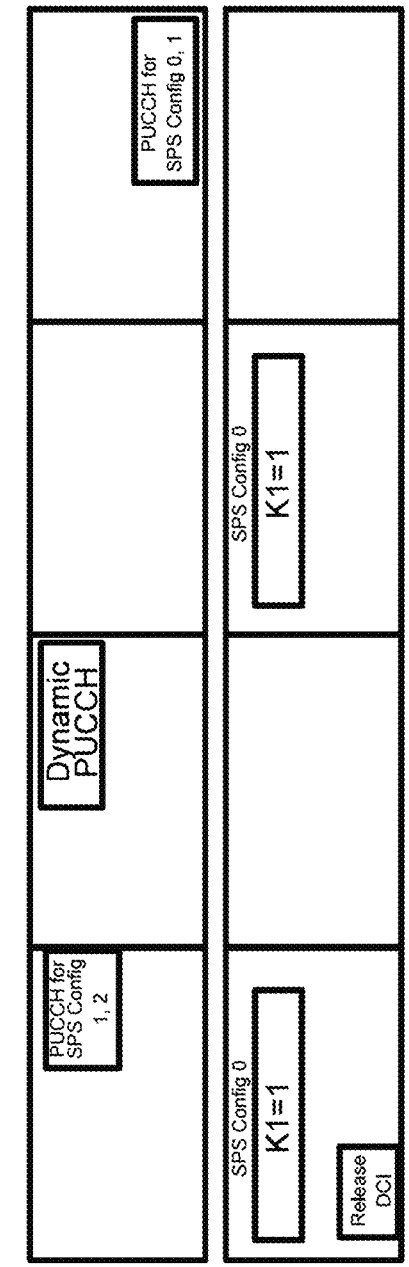

FIG. 6A and FIG. 6B illustrate an example of HARQ-ACK bit collision, in accordance with example implementations of the present disclosure.

In FIG. 6A, configurations for the example is illustrated. There are two SPS configurations. For SPS configuration 0, periodicity is 2 slots and K1 is 1. For SPS configuration 1, the periodicity is 1 slot and K1 is 1. The SPS PDSCH and PUCCH configured for transmission of a HARQ-ACK for an SPS PDSCH occurs periodically, and FIG. 6A shows four slots of the resources.

In FIG. 6B, an SPS PDSCH release is transmitted in the first slot, indicating the release of SPS configuration 1. In this case, since the HARQ-ACK bit location for the SPS PDSCH of SPS configuration 0 and the HARQ-ACK bit location for the SPS PDSCH release of SPS configuration 1 are the same, it is not clear which HARQ-ACK bit the UE should report. Similarly, if two SPS PDSCH releases (DCIs) for SPS configuration 0 and SPS configuration 1, respectively, are transmitted in the first slot, it is not clear which HARQ-ACK bit the UE should report.

Solutions to HARQ-ACK Bit Collision

For the case where the HARQ-ACK bit location for an SPS PDSCH and the HARQ-ACK bit location for an SPS PDSCH release DCI is the same, the HARQ-ACK bit for the SPS PDSCH release DCI is transmitted. Since not transmitting the HARQ-ACK for an SPS PDSCH release DCI may result in different understanding of whether the SPS configurations indicated in the SPS release DCI are released between the base station and the UE, it is preferred to prioritize the HARQ-ACK for an SPS PDSCH release DCI. For a deprioritized HARQ-ACK for the SPS PDSCH, the base station may schedule a retransmission of the SPS PDSCH using DCI with CRC scrambled by a CS-RNTI.

To resolve the case where the HARQ-ACK bit location for an SPS PDSCH and the HARQ-ACK bit location for an SPS PDSCH release DCI is the same, the following methods may be used.

Method 3

In one Implementation, the HARQ-ACK bit for the SPS PDSCH release DCI is transmitted. As illustrated in FIGS. 6A and 6B, for example, the HARQ-ACK bit location for an SPS PDSCH of SPS configuration 0 and the HARQ-ACK bit location for an SPS PDSCH release DCI indicating a release of SPS configuration 1 has the same location. In this case, a UE may transmit the HARQ-ACK for an SPS PDSCH release DCI in the second slot and does not transmit the HARQ-ACK for the SPS PDSCH of SPS configuration 0 received in the first slot.

In one approach, the HARQ-ACK bit for the SPS PDSCH or SPS PDSCH release DCI with the lowest SPS configuration index is transmitted. For the above example, a UE may transmit the HARQ-ACK for the SPS PDSCH of SPS configuration 0 received in the first slot.

In one approach, if an SPS PDSCH release DCI indicates release of multiple SPS configurations, then if the HARQ-ACK bit location for an SPS PDSCH and the HARQ-ACK bit location for an SPS PDSCH release DCI determined based on the TDRA table row index indicated in the activation DCI for an SPS PDSCH with the lowest SPS configuration index are the same, then the HARQ-ACK bit location for the SPS PDSCH release DCI is determined based on the TDRA table row index indicated in the activation DCI for an SPS PDSCH with the lowest SPS configuration index which gives a different HARQ-ACK bit location. In one approach, if the TDRA table row index indicated in the activation DCI for an SPS PDSCH for all SPS configurations gives the same HARQ-ACK bit location, then the HARQ-ACK bit for the SPS PDSCH is transmitted.

To resolve the case where the HARQ-ACK bit location for an SPS PDSCH release DCI is the same as the HARQ-ACK bit location for another SPS PDSCH release DCI, the following methods may be used.

Method 4

In one Implementation, the HARQ-ACK bit for the SPS PDSCH release DCI indicating the lowest SPS configuration is transmitted. For example, if the HARQ-ACK bit for an SPS PDSCH release DCI indicating a release of SPS configuration 0 and the HARQ-ACK bit for an SPS PDSCH release DCI indicating a release of SPS configuration 1 has the same HARQ-ACK bit location, then the HARQ-ACK bit for the SPS PDSCH release DCI indicating a release of SPS configuration 0 is transmitted.

In one approach, if an SPS PDSCH release DCI indicates release of multiple SPS configurations, and if the HARQ-ACK bit location determined based on the TDRA table row index indicated in the activation DCI for an SPS PDSCH with the lowest SPS configuration index is the same as another SPS PDSCH release DCI indicating a release of SPS configurations with lower SPS configuration index, then the HARQ-ACK bit location for the SPS PDSCH release DCI is determined based on the TDRA table row index indicated in the activation DCI for an SPS PDSCH with the lowest SPS configuration index which gives a different HARQ-ACK bit location. In one approach, if the TDRA table row index indicated in the activation DCI for an SPS PDSCH for all SPS configurations gives the same HARQ-ACK bit location, then the HARQ-ACK bit for the other SPS PDSCH release DCI is transmitted.

Method 5

Scheduling restrictions may be specified to avoid the issue of HARQ-ACK bit collision.

For example, a UE is not expected to be scheduled with an SPS PDSCH and an SPS PDSCH release DCI such that the HARQ-ACK bit location for the SPS PDSCH and the HARQ-ACK bit location for the SPS PDSCH release DCI are the same. Similarly, a UE is not expected to be scheduled with two or more SPS PDSCH release DCI such that the HARQ-ACK bit location for the one or more SPS PDSCH release DCI are the same.

PUCCH Resource Indication for HARQ-ACK for SPS PDSCH Release

For configurations of PUCCH resources for a HARQ-ACK codebook for an SPS PDSCH of multiple SPS configurations of the same priority, it is possible to configure the PUCCH resources as slot based or sub-slot based PUCCH resources. The priority of the HARQ-ACK for the SPS PDSCH of an SPS configuration is configured by an RRC parameter (i.e., harq-CodebookID-r16). Whether the PUCCH resources is slot based or sub-slot based is determined by the configuration of the PUCCH-Config associated with the priority of the HARQ-ACK.

Specifically, if a UE is provided a pdsch-HARQ-ACK-Codebook-List, the UE can be indicated by the pdsch-HARQ-ACK-Codebook-List to generate one or two HARQ-ACK codebooks. If the UE is indicated to generate one HARQ-ACK codebook, the HARQ-ACK codebook is associated with a PUCCH of a priority index 0. If a UE is provided a pdsch-HARQ-ACK-Codebook-List, the UE multiplexes in a same HARQ-ACK codebook only HARQ-ACK information associated with the same priority index. If the UE is indicated to generate two HARQ-ACK codebooks, a first HARQ-ACK codebook is associated with a PUCCH of priority index 0 and a second HARQ-ACK codebook is associated with a PUCCH of priority index 1;

the UE is provided first and second for each of {PUCCH-Config, UCI-OnPUSCH, PDSCH-codeBlockGroup-Transmission} by {P UCCHConfigurationList, UCI-OnPUSCH-List, PDSCH-CodeBlockGroupTransmission-List}, respectively, for use with the first and second HARQ-ACK codebooks, respectively.

If a UE receives a PDSCH without receiving a corresponding PDCCH (e.g., an SPS PDSCH), or if the UE receives a PDCCH indicating an SPS PDSCH release, the UE generates one corresponding HARQ-ACK information bit. If the UE generates two HARQ-ACK codebooks, the UE is indicated by a harq-CodebookID, per SPS configuration, a HARQ-ACK codebook index for multiplexing the corresponding HARQ-ACK information bit.

If a UE is provided a subslotLengthForPUCCH-r16 for a PUCCH-Config, a slot for a PUCCH transmission associated with the PUCCH-Config includes a number of symbols indicated by the subslotLengthForPUCCH-r16, and the PUCCH transmission is referred as a sub-slot based PUCCH.

For a Type 1 HARQ-ACK codebook, a HARQ-ACK bit location for an SPS PDSCH release is the same as a HARQ-ACK bit for an SPS PDSCH. In other words, the HARQ-ACK bit position of the HARQ-ACK for an SPS PDSCH release DCI in a slot is determined to be the same as the HARQ-ACK bit position of a HARQ-ACK bit for a PDSCH candidate position that may be allocated by the SLIV in the slot, which is used to allocate an SPS PDSCH of the SPS configuration released by the SPS release DCI. In case of a sub-slot based PUCCH, the K1 value for the sub-slot based PUCCH is in unit of sub-slots. Because the reference sub-slot for counting K1 may be different for an SPS PDSCH and an SPS PDSCH release, there may be no HARQ-ACK bit position for the SPS PDSCH release in the sub-slot in which it is received.

For example, an SPS PDSCH release DCI has an ending symbol overlapping the first UL sub-slot, while the SPS PDSCH has an ending symbol overlapping the second UL sub-slot. Thus, the HARQ-ACK bit of the SPS release DCI should be one of the HARQ-ACK bit for the first sub-slot. However, based on the current rule, there is no candidate HARQ-ACK bit position that may be used to carry the HARQ-ACK for the SPS PDSCH release DCI in the first sub-slot.

Solutions to PUCCH Resource Indication for HARQ-ACK for SPS PDSCH Release

For issues described above with regard to PUCCH resource indication for a HARQ-ACK for an SPS PDSCH release, a reference sub-slot should be defined for determination of the end of an SPS PDSCH release DCI, and the PUCCH resource for transmission of a HARQ-ACK for an SPS PDSCH release DCI is K1 sub-slots from the reference sub-slot, where K1 is the value indicated in PDSCH-to-HARQ feedback timing indicator field in the SPS PDSCH release DCI.

For the issue where the end of an SPS PDSCH and the end of an SPS PDSCH release DCI are located in different sub-slots, the following methods may be used. In the following, if a PDSCH, SPS PDSCH or an SPS PDSCH release DCI has ending symbol overlapping with an UL sub-slot, it is described as the PDSCH or SPS PDSCH ends in the (UL) sub-slot.

Method 6

A reference sub-slot is defined for determination of PUCCH resource for HARQ-ACK for an SPS PDSCH release DCI, and the PUCCH resource for HARQ-ACK for the SPS PDSCH release DCI is K1 sub-slots from the reference sub-slot, where K1 is the value indicated in PDSCH-to-HARQ feedback timing indicator field in the SPS PDSCH release DCI, if harq-CodebookID of the SPS configuration released by the SPS PDSCH release DCI indicates a Type 1 HARQ-ACK codebook.

In the examples illustrated in FIGS. 7A and 7B, the reference sub-slot is defined as the sub-slot in a slot in which a PDSCH or an SPS PDSCH ends in the slot in which SPS PDSCH release DCI is received, where the PDSCH or SPS PDSCH uses the same SLIV as the SLIV used by an SPS PDSCH of the SPS configuration released by the SPS PDSCH release DCI, i.e., the second sub-slot in this example. The sub-slot in which the PUCCH resource for an SPS PDSCH release DCI is located is then determined to be K1 sub-slots from the second sub-slot. In other words, in a Type 1 HARQ-ACK codebook, an SPS PDSCH release DCI ends in a first sub-slot in a slot may be determined to be associated with a HARQ-ACK bit with HARQ-ACK bit position corresponding to PDSCH candidate position(s) end in a second sub-slot in the slot if an SPS PDSCH of the SPS configuration released by the SPS PDSCH release DCI is allocated by a SLIV that may be used to allocate one of the PDSCH candidate position(s).

In FIG. 7A, configurations for the example is illustrated. An SPS configuration with K1 of 2 sub-slots is configured. One DL slot overlaps with two UL sub-slots. Four UL sub-slots are shown in the figure.

In FIG. 7B, an SPS PDSCH release is transmitted in the first sub-slot, indicating to release the SPS configuration. The reference sub-slot is determined based on the end of a PDSCH candidate position defined by the SLIV used for allocating a SPS PDSCH of the SPS configuration. The second sub-slot is determined as the reference sub-slot in the example. The PUCCH for HARQ-ACK transmission for the SPS PDSCH release is scheduled in the fourth sub-slot, and the value of K1 indicated in the SPS PDSCH release is 2 instead of 3.

In one approach, the K1 value for determination of the PUCCH resource for an SPS PDSCH release DCI is based on the K1 value of the SPS PDSCH activation DCI of the corresponding SPS PDSCH if the PUCCH is sub-slot based.

In one approach, the reference sub-slot is defined as the same sub-slot as the sub-slot of the ending symbol of the corresponding SPS PDSCH which is in the same slot as the SPS PDSCH release DCI.

In one approach, the reference sub-slot is defined as the same sub-slot as the sub-slot of the ending symbol of a corresponding SPS PDSCH which has an earliest starting symbol starting at the same symbol or later than the starting symbol of the SPS PDSCH release DCI.

In one approach, the reference sub-slot is defined as the same sub-slot as the sub-slot of the ending symbol of a corresponding SPS PDSCH which has an earliest ending symbol at the same symbol or later than the ending symbol of the SPS PDSCH release DCI.

In one approach, the reference sub-slot is defined as the same sub-slot as the sub-slot of the ending symbol of a corresponding SPS PDSCH which overlaps with the SPS PDSCH release DCI.

In one approach, the reference sub-slot is defined as the sub-slot in which a PDSCH candidate position ends, and the HARQ-ACK bit position of the SPS PDSCH release DCI is the same as that of the PDSCH candidate position. The PDSCH candidate position may be the PDSCH candidate position that may be allocated by the SLIV in the TDRA table that may fully contain the SPS PDSCH release DCI in time domain. In one implementation, when more than one SLIV in the TDRA table may fully contain the SPS PDSCH release DCI in time domain, the SLIV with earliest starting symbol is selected. In one implementation, when more than one SLIV in the TDRA table may fully contain the SPS PDSCH release DCI in time domain, the SLIV with latest starting symbol is selected. In one implementation, when more than one SLIV in the TDRA table satisfies at least one of the above conditions, the SLIV with shortest length is selected. In one implementation, when more than one SLIV in the TDRA table satisfies at least one of the above conditions, the SLIV with ending symbol in the same sub-slot in which the SPS PDSCH release DCI ends is selected.

In one approach, the reference sub-slot is defined as the sub-slot in which the SPS PDSCH release DCI ends, and the HARQ-ACK bit position of the SPS PDSCH release DCI in the sub-slot is the same as that of the PDSCH candidate position which ends in the sub-slot. The PDSCH candidate position may be the PDSCH candidate position that may be allocated by the SLIV in the TDRA table that overlaps with the SPS PDSCH release DCI in time domain and ends in the same sub-slot as the sub-slot in which the SPS PDSCH release DCI ends. In one implementation, when more than one SLIV in the TDRA table overlaps with the SPS PDSCH release DCI in time domain and ends in the same sub-slot as the sub-slot in which the SPS PDSCH release DCI ends, the SLIV with earliest starting symbol is selected. In one implementation, when more than one SLIV in the TDRA table overlaps with the SPS PDSCH release DCI in time domain and ends in the same sub-slot as the sub-slot in which the SPS PDSCH release DCI ends, the SLIV with latest starting symbol is selected. In one implementation, when more than one SLIV in the TDRA table satisfies at least one of the above conditions, the SLIV with shortest length is selected. In one implementation, the PDSCH candidate position may be the PDSCH candidate position that may be allocated by the SLIV in the row of TDRA table with smallest row index and ends in the same sub-slot as the sub-slot in which the SPS PDSCH release DCI ends.

Method 7

Scheduling restriction is defined for resolving the HARQ-ACK bit location in a Type 1 HARQ-ACK codebook for an SPS PDSCH release DCI.

For Method 7, the sub-slot in which the PUCCH resource for an SPS PDSCH release DCI is located is K1 sub-slots from the sub-slot where the SPS PDSCH release DCI ends or from the reference sub-slot as in Method 6. Determination of the HARQ-ACK bit position of the HARQ-ACK bit for the SPS PDSCH release DCI in a PUCCH may be based on Method 6.

To avoid HARQ-ACK bit location collision, UE is not expected to be scheduled with a PDSCH using one of the PDSCH candidate positions ending in a first sub-slot in the slot which is associated with a HARQ-ACK bit with the same HARQ-ACK bit position in a PUCCH as the HARQ-ACK bit for a SPS PDSCH release DCI ending in a second sub-slot in the slot.

In one approach, UE is not expected to be scheduled a PUCCH in a sub-slot for HARQ-ACK for a SPS PDSCH release DCI if a SPS PDSCH of a SPS configuration not released by the SPS PDSCH release DCI has starting symbol not after 14 symbols after the ending symbol of the SPS PDSCH release DCI, and if the PUCCH configured for HARQ-ACK for the SPS PDSCH is in the sub-slot, and if the HARQ-ACK bit for the SPS PDSCH is with the same HARQ-ACK bit position as the HARQ-ACK bit for the SPS PDSCH release DCI.

In one approach, UE is not expected to receive a SPS PDSCH of a SPS configuration not released by a SPS PDSCH release DCI, if the SPS PDSCH has a starting symbol that is 14 symbols after the ending symbol of the SPS PDSCH release DCI, and if the PUCCH configured for HARQ-ACK for the SPS PDSCH is in the same sub-slot as the PUCCH for HARQ-ACK for SPS PDSCH release DCI, and if the HARQ-ACK bit for the SPS PDSCH is with the same HARQ-ACK bit position as the HARQ-ACK bit for the SPS PDSCH release DCI.

In one approach, UE is not expected to receive a SPS PDSCH of a SPS configuration not released by a SPS PDSCH release DCI, if the ending symbol of the SPS PDSCH release DCI is not after the ending symbol of the SPS PDSCH, and if the PUCCH configured for HARQ-ACK for the SPS PDSCH is in the same sub-slot as the PUCCH for HARQ-ACK for SPS PDSCH release DCI, and if the HARQ-ACK bit for the SPS PDSCH is with the same HARQ-ACK bit position as the HARQ-ACK bit for the SPS PDSCH release DCI.

Method 8

For determination of the unit of K1 for an SPS PDSCH release DCI, i.e., slot or sub-slot, and in case of sub-slot, the length of a sub-slot, it is based on the priority value configured by an explicit RRC parameter for the HARQ-ACK codebook of the SPS configuration. That is, if the SPS PDSCH release DCI is a DCI format 1_0, or if it is a DCI format 1_1 or DCI format 1_2 with or without priority field, the unit of K1 for an SPS PDSCH release DCI is based on the RRC configured priority value, regardless of the priority field in SPS PDSCH release DCI.

Other Issues

Another issue may involve the content of an SPS PDSCH activation/release DCI. Since a HARQ process number field is used to indicate which SPS configuration is activated and which SPS configuration(s) are released, the number of bits for PDCCH validation for the SPS PDSCH activation or release is reduced, which may result in an increase in the number of false alarms for the PDCCH validation.

Another issue may be that an SPS PDSCH release DCI may affect the HARQ-ACK codebook size for a PUCCH configured for a HARQ-ACK for an SPS PDSCH. In case the configured PUCCH overlaps another PUCCH or PUSCH, the HARQ-ACK for the SPS PDSCH is multiplexed on the PUCCH or PUSCH. A multiplexing timeline for the PUCCH and PUSCH considering the SPS PDSCH release DCI therefore needs to be defined.

Solutions to Other Issues

To lower the false alarm rate of the SPS PDSCH activation DCI and SPS PDSCH release DCI, more DCI fields should be utilized for the SPS PDSCH activation DCI and the SPS PDSCH release DCI validation. Since the priority field in the SPS PDSCH activation DCI and the SPS PDSCH release DCI does not affect the priority of the HARQ-ACK codebook for the SPS PDSCH, it may be set to a fixed value, e.g., set to '0' in the SPS PDSCH activation DCI and SPS PDSCH release DCI. It is noted that the priority of an HARQ-ACK codebook for an SPS PDSCH is configured by an explicit RRC parameter in an SPS configuration.

PDCCH Validation for SPS PDSCH Activation and SPS PDSCH Release

Method 9

To lower the false alarm rate of SPS PDSCH activation DCI and SPS PDSCH release DCI, more DCI fields should be utilized for an SPS PDSCH activation DCI and SPS PDSCH release DCI validation. Since the priority field in SPS PDSCH activation DCI and SPS PDSCH release DCI does not affect the priority of a HARQ-ACK codebook for an SPS PDSCH, it may be set to a fixed value, e.g., set to '0' in the SPS PDSCH activation DCI and SPS PDSCH release DCI. It is noted that the priority of a HARQ-ACK codebook for an SPS PDSCH is configured by an explicit RRC parameter in SPS configuration.

In one approach, the priority field in SPS PDSCH activation DCI and SPS PDSCH release DCI is set to the same value as the RRC configured priority value for the SPS configuration to be activated or released. This method has the advantage that UE can determine the unit of K1 (slot or sub-slot) and the PUCCH resources based on the priority field in the SPS PDSCH release DCI.

In one approach, the PDSCH-to-HARQ feedback timing indicator field is used for validation of SPS PDSCH release DCI. The field is set to all '0's. In one approach, the field is set to all '1's. An alternative may be used when K1 value for determination of the PUCCH resource for an SPS PDSCH release DCI is based on the K1 value of the SPS PDSCH activation DCI of the corresponding SPS PDSCH, when the PUCCH is sub-slot based.

UCI Multiplexing Timeline Considering SPS PDSCH Release DCI

Method 10

The multiplexing timeline considering SPS PDSCH release DCI depends on the adopted approach in Method 1.

Assume the following alternative in Method 1 is adopted: The HARQ-ACK for an SPS PDSCH is not transmitted if the PUCCH for a HARQ-ACK transmission of the SPS PDSCH starts later than N symbols after the end of SPS PDSCH release DCI indicating a release of the corresponding SPS configuration. Then, the following timeline requirement may be added on top of the Rel-15 UCI multiplexing timeline requirements:

If a UE would transmit multiple overlapping PUCCHs in a slot or overlapping PUCCH(s) and PUSCH(s) in a slot and, when applicable as described in Subclauses 9.2.5.1 and 9.2.5.2, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $s_0$ of the earliest PUCCH or PUSCH, among a group overlapping PUCCHs and PUSCHs in the slot, satisfies the following timeline conditions:

$S_0$ is not before a symbol with CP starting after $T_{proc,release}^{mux}$ after a last symbol of an SPS PDSCH release jointly release a subset of SPS configurations with SPS PDSCHs having corresponding HARQ-ACKs not transmitted in one of the overlapping PUCCH in response to the SPS PDSCH release. $T_{proc,release}^{mux}$ is given by maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i} = (N+1) \cdot (2048 + 144) \cdot \kappa \cdot 2^{-\mu} \cdot T_C$, N is described in Subclause 10.2 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

In various implementations of the present disclosure, a BWP may be a subset of the total cell bandwidth of a cell, and bandwidth part adaptation is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of CA, the gNB configures the UE with DL BWP(s) at least (i.e. there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

```
-   -- ASN1START
-   -- TAG-SPS-CONFIG-START
-
-   SPS-Config ::=                SEQUENCE {
-       periodicity               ENUMERATED {ms10, ms20, ms32, ms40, ms64,
    ms80, ms128, ms160, ms320, ms640,
-                                              spare6, spare5, spare4, spare3,
    spare2, spare1 },
-       nrofHARQ-Processes        INTEGER(1..8),
-       n1PUCCH-AN                PUCCH-ResourceId      OPTIONAL,  -- Need
    M
-       mcs-Table                 ENUMERATED {qam64LowSE}  OPTIONAL,  -
    - Need S
-
-       ...,
-       [[
-       sps-ConfigIndex-r16                       SPS-ConfigIndex-r16
-       OPTIONAL, -- Cond SPS-List
-       harq-ProcID-Offset-r16                    INTEGER (0..15)
-       OPTIONAL, -- Need R
-       periodicityExt-r16                        INTEGER (1..5120)
-       OPTIONAL, -- Need R
-       harq-CodebookID-r16                       INTEGER (1..2)
-       OPTIONAL, -- Need R
-       pdsch-AggregationFactor-r16   ENUMERATED {n1, n2, n4, n8 }  OPTIONAL      -
        - Need S
-       ]]
-   }
-
-   -- TAG-SPS-CONFIG-STOP
-   -- ASN1STOP
```

-continued

SPS-Config field descriptions
harq-CodebookID
Indicates the HARQ-ACK codebook index for the corresponding HARQ-ACK codebook
for SPS PDSCH and ACK for SPS PDSCH release.
harq-ProcID-Offset
Indicates the offset used in deriving the HARQ process IDs, see TS 38.321[3], clause 5.3.1.
mcs-Table
Indicates the MCS table the UE shall use for DL SPS (see TS 38.214 [19], clause 5.1.3.1.
If present, the UE shall use the MCS table of low-SE 64QAM table indicated in Table
5.1.3.1-3 of TS 38.214 [19]. If this field is absent and field mcs-table in PDSCH-Config is
set to 'qam256' and the activating DCI is of format 1_1, the UE applies the 256QAM table
indicated in Table 5.1.3.1-2 of TS 38.214 [19]. Otherwise, the UE applies the non-low-SE
64QAM table indicated in Table 5.1.3.1-1 of TS 38.214 [19].
n1PUCCH-AN
HARQ resource for PUCCH for DL SPS. The network configures the resource either as
format0 or format1. The actual PUCCH-Resource is configured in PUCCH-Config and
referred to by its ID. See TS 38.213 [13], clause 9.2.3.
nrofHARQ-Processes
Number of configured HARQ processes for SPS DL (see TS 38.321 [3], clause 5.8.1).
pdsch-AggregationFactor
Number of repetitions for SPS PDSCH (see TS 38.214 [19], clause 5.1.2.1). When the field
is absent, the UE applies PDSCH aggregation factor signalled in PDSCH-Config.
periodicity
Periodicity for DL SPS (see TS 38.214 [19] and TS 38.321[3], clause 5.8.1).
periodicityExt
This field is used to calculate the periodicity for DL SPS (see TS 38.214 [19] and see TS
38.321[3], clause 5,8.1). If this field is present, the field periodicity is ignored.
The following periodicities are supported depending on the configured subcarrier spacing
[slots]:
15 kHz: periodicityExt, where periodicityExt has a value between 1 and 640.
30 kHz: periodicityExt, where periodicityExt has a value between 1 and 1280.
60 kHz with normal CP: periodicityExt, where periodicityExt has a value between 1 and
2560.
60 kHz with ECP: periodicityExt, where periodicityExt has a value between 1 and 2560.
120 kHz: periodicityExt, where periodicityExt has a value between 1
and 5120.
sps-ConfigIndex
Indicates the index of one of multiple SPS configurations.

Rel-15 Timeline Requirements for UCI Multiplexing

If a UE would transmit multiple overlapping PUCCHs in a slot or overlapping PUCCH(s) and PUSCH(s) in a slot and, when applicable as described in Subclauses 9.2.5.1 and 9.2.5.2, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $s_0$ of the earliest PUCCH or PUSCH, among a group overlapping PUCCHs and PUSCHs in the slot, satisfies the following timeline conditions:

$s_0$ is not before a symbol with CP starting after $T_{proc,1}^{mux}$ after a last symbol of any corresponding PDSCH, $T_{proc,1}^{mux}$ is given by maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping PUCCHs and PUSCHs, $T_{proc,1}^{mux,i}=(N_1+d_{1,1}+1)\cdot(2048+144)\cdot\kappa\cdot 2^{-\mu}\cdot T_C$, $d_{1,1}$ is selected for the i-th PDSCH following [6, TS 38.214], $N_1$ is selected based on the UE PDSCH processing capability of the i-th PDSCH and SCS configuration μ, where μ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

$S_0$ is not before a symbol with CP starting after $T_{proc,release}^{mux}$ after a last symbol of any corresponding SPS PDSCH release. $T_{proc,release}^{mux}$ is given by maximum of $\{T_{proc,release}^{mux,1}, \ldots, T_{proc,release}^{mux,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{mux,i}=(N+1)\cdot(2048+144)\cdot\kappa\cdot 2^{-\mu}\cdot T_C$, N is described in Subclause 10.2 and is selected based on the UE PDSCH processing capability of the i-th SPS PDSCH release and SCS configuration μ, where μ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

if there is no aperiodic CSI report multiplexed in a PUSCH in the group of overlapping PUCCHs and PUSCHs, $S_0$ is not before a symbol with CP starting after $T_{proc,2}^{mux}$ after a last symbol of
any PDCCH with the DCI format scheduling an overlapping PUSCH, and
any PDCCH scheduling a PDSCH or SPS PDSCH release with corresponding HARQ-ACK information in an overlapping PUCCH in the slot If there is at least one PUSCH in the group of overlapping PUCCHs and PUSCHs, $T_{proc,2}^{mux}$ is given by maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i}=\max((N_2+d_{2,1}+1)\cdot(2048+144)\cdot\kappa\cdot 2^{-\mu}\cdot T_C, d_{2,2})$, $d_{2,1}$ and $d_{2,2}$ are selected for the i-th PUSCH following [6, TS 38.214], $N_2$ is selected based on the UE PUSCH processing capability of the i-th PUSCH and SCS configuration μ, where μ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

If there is no PUSCH in the group of overlapping PUCCHs and PUSCHs, $T_{proc,2}^{mux}$ is given by maximum of $\{T_{proc,2}^{mux,1}, \ldots, T_{proc,2}^{mux,i}, \ldots\}$ where for the i-th PDSCH with corresponding HARQ-ACK transmission on a PUCCH which is in the group of overlapping PUCCHs, $T_{proc,2}^{mux,i} = (N_2+1) \cdot (2048+144) \cdot \kappa \cdot 2^{-\mu} \cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

if there is an aperiodic CSI report multiplexed in a PUSCH in the group of overlapping PUCCHs and PUSCHs, $S_0$ is not before a symbol with CP starting after $T_{proc,CSI}^{mux}=\max((Z+d)\cdot(2048+144)\cdot\kappa\cdot 2^{-\mu}\cdot T_C$, $d_{2,2}$) after a last symbol of any PDCCH with the DCI format scheduling an overlapping PUSCH, and any PDCCH scheduling a PDSCH or SPS PDSCH release with corresponding HARQ-ACK information in an overlapping PUCCH in the slot where μ corresponds to the smallest SCS configuration among the SCS configuration of the PDCCHs, the smallest SCS configuration for the group of the overlapping PUSCHs, and the smallest SCS configuration of CSI-RS associated with the DCI format scheduling the PUSCH with the multiplexed aperiodic CSI report, and d=2 for μ=0,1, d=3 for μ=2 and d=4 for μ=3

$N_1, N_2, d_{1,1}, d_{2,1}, d_{2,2}$, and Z are defined in [6, TS 38.214], and κ and $T_C$ are defined in [4, TS 38.211].

$T_{proc,2}$ $T_{proc,2} = \max((N_2+d_{2,1})(2048+144)\cdot\kappa 2^{-\mu}\cdot T_C, d_{2,2})$ $N_2$ is based on μ of Table 6.4-1 and Table 6.4-2 for UE processing capability 1 and 2 respectively, where μ corresponds to the one of ($\mu_{DL}, \mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and κ is defined in subclause 4.1 of [4, TS 38.211].

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in [11, TS 38.133].

If the scheduling DCI triggered a switch of BWP, $d_{2,2}$ equals to the switching time as defined in [11, TS 38.133], otherwise $d_{2,2}=0$.

Figure 8:
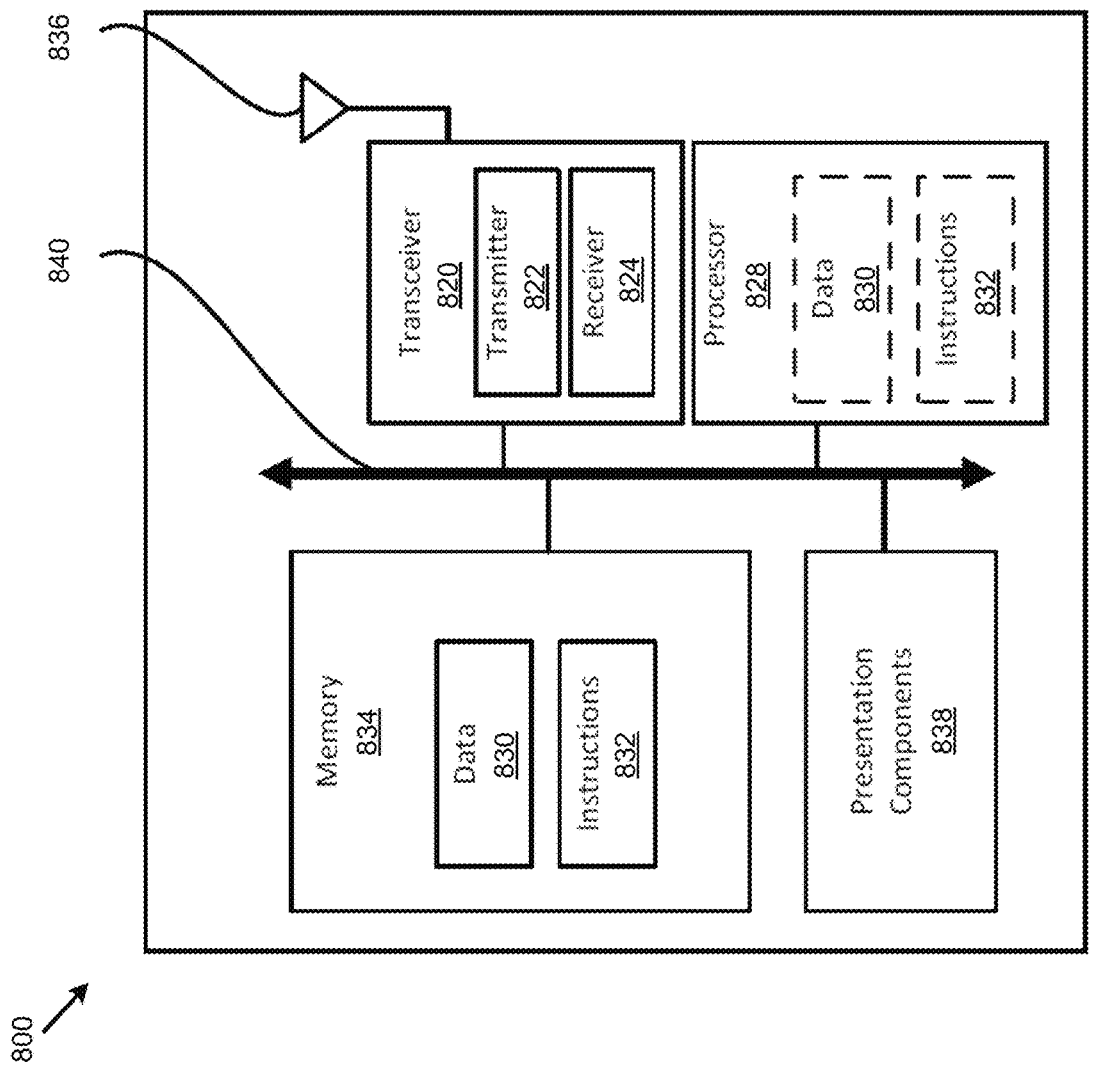
FIG. 8 is a block diagram illustrating a node for wireless communication, according to various aspects of the present disclosure.

FIG. 8 is a block diagram illustrating a node for wireless communication, according to various aspects of the present disclosure. As illustrated in FIG. 8, a node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIGS. 1 through 7B.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable and flexibly usable subframes and slot formats. The transceiver 820 may be configured to receive data and control channels.

The node 800 may include a variety of computer-readable media. Computer-readable media may be any available media that may be accessed by the node 800 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 834 may include computer-storage media in the form of volatile and/or non-volatile memory. The memory 834 may be removable, non-removable, or a combination thereof. Example memory may include solid-state memory, hard drives, optical-disc drives, etc. As illustrated in FIG. 8, the memory 834 may store computer-readable, computer-executable instructions 832 (e.g., software codes) that are configured to cause the processor 828 to perform various functions disclosed herein, for example, with reference to FIGS. 1 through 7B. Alternatively, the instructions 832 may not be directly executable by the processor 828 but be configured to cause the node 800 (e.g., when compiled and executed) to perform various functions disclosed herein.

The processor 828 (e.g., having processing circuitry) may include an intelligent hardware device, e.g., a Central Processing Unit (CPU), a micro-controller, an ASIC, etc. The processor 828 may include memory. The processor 828 may process the data 830 and the instructions 832 received from the memory 834, and information transmitted and received via the transceiver 820, the baseband communications module, and/or the network communications module. The processor 828 may also process information to be sent to the transceiver 820 for transmission via the antenna 836 to the network communications module for transmission to a core network.

One or more presentation components 838 may present data indications to a person or another device. Examples of presentation components 838 may include a display device, a speaker, a printing component, and a vibrating component, etc.

The present disclosure contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

What is claimed is:

1. A method performed by a user equipment (UE), the method comprising:
   receiving a radio resource control (RRC) configuration carrying a configuration for a first downlink (DL) channel and an uplink (UL) channel;
   receiving the first DL channel and a second DL channel; and
   canceling the UL channel transmission for a hybrid automatic repeat request acknowledgement (HARQ-ACK) feedback when a timing condition between the first DL channel and the second DL channel is satisfied, wherein:
      the first DL channel is a semi-persistent scheduling (SPS) physical downlink shared channel (PDSCH) configured by one of one or more SPS configurations,
      the UL channel is a physical uplink control channel (PUCCH) for a HARQ-ACK feedback associated with the SPS PDSCH, and
      the second DL channel is a physical downlink control channel (PDCCH) carrying an SPS PDSCH release of one or more of the one or more SPS configurations.

2. The method of claim 1, wherein the timing condition is that the second DL channel is received no later than the first DL channel.

3. The method of claim 1, wherein the first DL channel overlaps the second DL channel in time domain.

4. The method of claim 1, wherein the SPS PDSCH release is carried in a downlink control information (DCI) format.

5. The method of claim 1, wherein the timing condition is that a last symbol of the PDCCH is received not after a last symbol of the SPS PDSCH in a slot.

6. A user equipment (UE), comprising:
   one or more non-transitory computer-readable media storing computer-executable instructions for scheduling radio resources for the UE; and
   at least one processor coupled to the one or more non-transitory computer-readable media, and configured to execute the computer-executable instructions to:
      receive a radio resource control (RRC) configuration carrying a configuration for a first downlink (DL) channel and an uplink (UL) channel;
      receive the first DL channel and a second DL channel; and
      cancel the UL channel transmission for a hybrid automatic repeat request acknowledgement (HARQ-ACK) feedback when a timing condition between the first DL channel and the second DL channel is satisfied, wherein:
         the first DL channel is a semi-persistent scheduling (SPS) physical downlink shared channel (PDSCH) configured by one of one or more SPS configurations,
         the UL channel is a physical uplink control channel (PUCCH) for the HARQ-ACK feedback associated with the SPS PDSCH, and
         the second DL channel is a physical downlink control channel (PDCCH) carrying an SPS PDSCH release of one or more of the one or more SPS configurations.

7. The UE of claim 6, wherein the timing condition is that the second DL channel is received no later than the first DL channel.

8. The UE of claim 6, wherein the first DL channel overlaps the second DL channel in time domain.

9. The UE of claim 6, wherein the SPS PDSCH release is carried in a downlink control information (DCI) format.

10. The UE of claim 6, wherein the timing condition is that a last symbol of the PDCCH is received not after a last symbol of the SPS PDSCH in a slot.

* * * * *